US010924183B2

(12) United States Patent
Gupta et al.

(10) Patent No.: US 10,924,183 B2
(45) Date of Patent: Feb. 16, 2021

(54) RECONFIGURABLE WIRELESS DATA CENTER NETWORK USING FREE-SPACE OPTICS

(71) Applicant: THE RESEARCH FOUNDATION FOR THE STATE UNIVERSITY OF NEW YORK, Albany, NY (US)

(72) Inventors: Himanshu Gupta, Stony Brook, NY (US); Navid Hamedazimi, Mountain View, CA (US); Samir Ranjan Das, Melville, NY (US); Jon Longtin, Port Jefferson, NY (US); Vyas Sekar, Pittsburgh, PA (US); Max Curran, Northport, NY (US)

(73) Assignee: THE RESEARCH FOUNDATION FOR THE STATE UNIVERSITY OF NEW YORK, Albany, NY (US)

( * ) Notice: Subject to any disclaimer, the term of this patent is extended or adjusted under 35 U.S.C. 154(b) by 0 days.

(21) Appl. No.: 16/010,191

(22) Filed: Jun. 15, 2018

(65) Prior Publication Data
US 2018/0294877 A1    Oct. 11, 2018

Related U.S. Application Data

(62) Division of application No. 14/934,863, filed on Nov. 6, 2015, now Pat. No. 10,020,880.
(Continued)

(51) Int. Cl.
*H04Q 11/00* (2006.01)
*H04B 10/114* (2013.01)
(Continued)

(52) U.S. Cl.
CPC ......... *H04B 10/11* (2013.01); *H04B 10/1149* (2013.01); *H04L 41/0803* (2013.01); *H04Q 2011/0026* (2013.01)

(58) Field of Classification Search
CPC ............ H04B 10/1149; H04Q 2011/0026-003
See application file for complete search history.

(56) References Cited

U.S. PATENT DOCUMENTS 8,301,028 B2    10/2012    Davidson et al.
8,483,569 B2    7/2013    Davidson et al.
(Continued)

OTHER PUBLICATIONS

Daniel Halperin, et al., "Augmenting Data Center Networks with Multi-Gigabit Wireless Links," SIGCOMM' 11, Aug. 15-19, 2011, Toronto, Ontario, Canada, pp. 38-49.
(Continued)

*Primary Examiner* — Nathan M Cors
(74) *Attorney, Agent, or Firm* — F. Chau & Associates, LLC

(57) ABSTRACT

A reconfigurable free-space optical inter-rack network includes a plurality of server racks, each including at least one switch mounted on a top thereof, where each top-mounted switch includes a plurality of free-space-optic link connector, each with a free-space optical connection to a free-space-optic link connector on another top-mounted switch, a single ceiling mirror above the plurality of server racks that substantially covers the plurality of server racks, wherein the single ceiling mirror redirects optical connections between pairs of free-space-optic link connectors to provide a clear lines-of-sight between each pair of connected free-space-optic link connectors, and a controller that pre-configures a free-space optical network connecting the plurality of server racks by establishing connections between pairs of free-space-optic link connectors, and that reconfigures connections between pairs of free-space-optic link connectors in response to network traffic demands and events.

11 Claims, 25 Drawing Sheets

Related U.S. Application Data

(60) Provisional application No. 62/076,064, filed on Nov. 6, 2014.

(51) Int. Cl.
*H04B 10/11* (2013.01)
*H04L 12/24* (2006.01)

(56) References Cited

U.S. PATENT DOCUMENTS

| | | | |
|---|---|---|---|
| 2003/0175031 A1* | 9/2003 | Shikakura | H04B 10/1125 398/118 |
| 2004/0146298 A1* | 7/2004 | Ikegame | H04Q 11/0005 398/45 |
| 2011/0262137 A1* | 10/2011 | Davidson | H04B 10/1149 398/59 |
| 2012/0155885 A1 | 6/2012 | Hannah et al. | |
| 2016/0173199 A1 | 8/2016 | Gupta et al. | |

OTHER PUBLICATIONS

Xia Zhou, et al., "Mirror Mirror on the Ceiling: Flexible Wireless Links for Data Centers," SIGCOMM' 12, Aug. 13-17, 2012, Helsinki, Findland, pp. 1-12.

\* cited by examiner

FSO link design

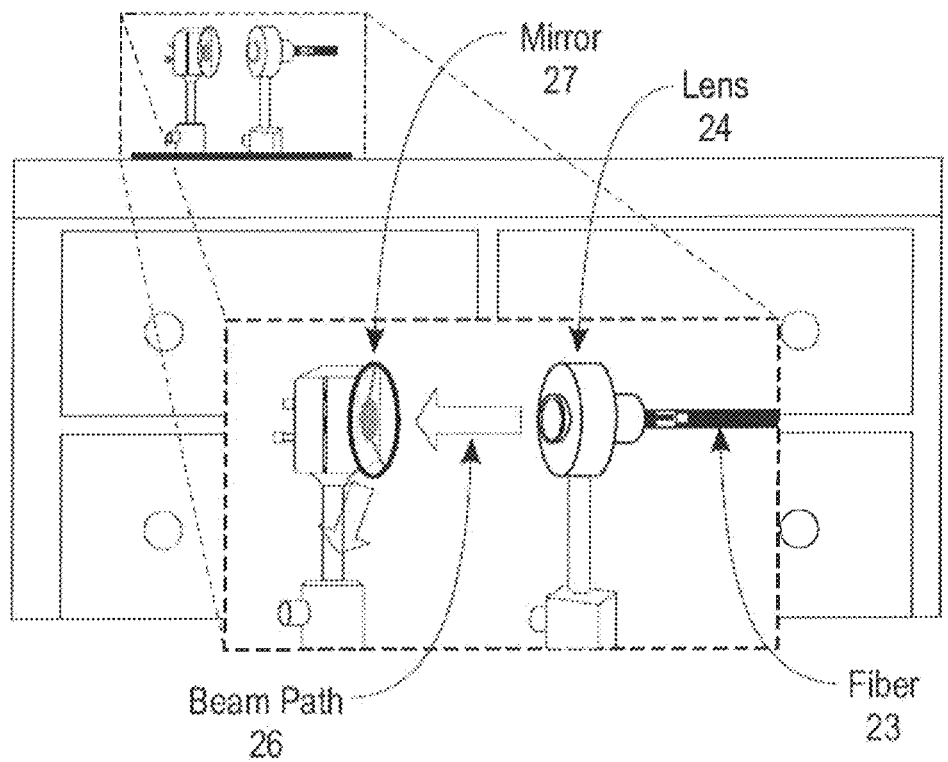
Figure 2(b): DC set up
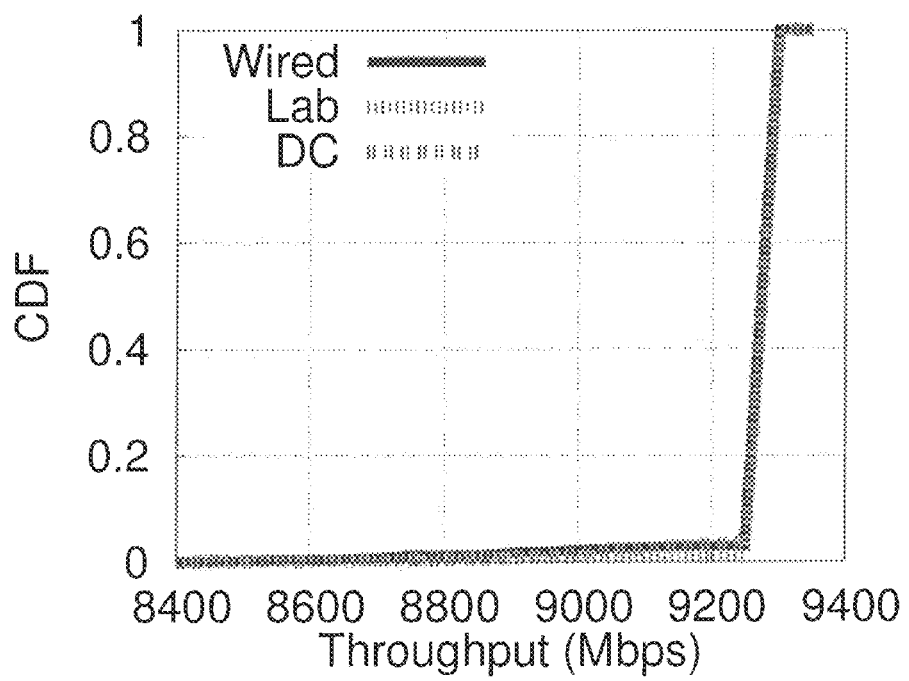
Figure 2(c)

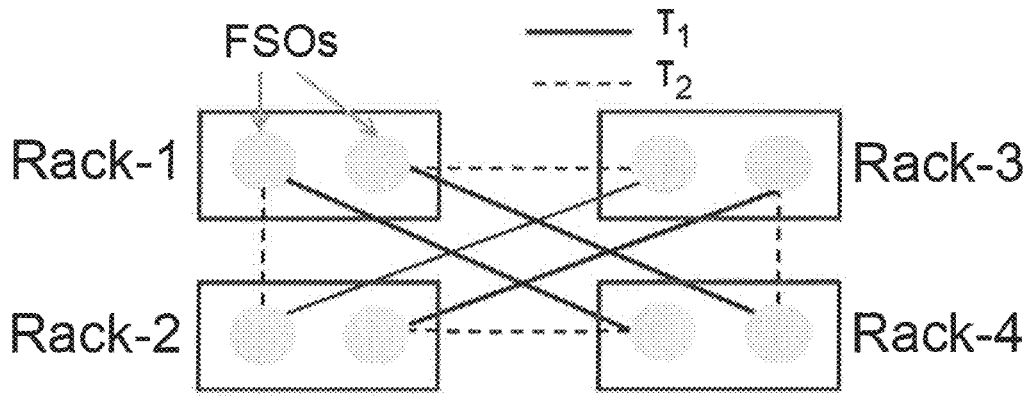

Figure 4

$$\max \sum_{i,j} T_{i,j} \text{ subject to:} \tag{1}$$

$$\forall b: \sum_{a \text{ s.t. } (a,b) \in \kappa} l_{a,b} \leq 1; \quad \forall a: \sum_{b \text{ s.t.}(a,b) \in \kappa} l_{a,b} \leq 1 \tag{2}$$

$$\forall a,b: \sum_{i,j} f_{a,b}^{i,j} \leq l_{a,b} \times C \times E \tag{3}$$

$$\forall i,j,k: \sum_a \sum_{b \in FSOs(k)} f_{a,b}^{i,j} = \sum_{b \in FSOs(k)} \sum_d f_{b,d}^{i,j} \tag{4}$$

$$\forall i,j: \sum_{a \in FSOs(i)} \sum_b f_{a,b}^{i,j} = \sum_a \sum_{b \in FSOs(j)} f_{a,b}^{i,j} = T_{i,j} \tag{5}$$

$$\forall i,j: T_{i,j} \leq D_{i,j} \tag{6}$$

$$\forall (a,b) \in \kappa: l_{a,b} \in \{0,1\}; \quad \forall i,j,a,b: f_{a,b}^{i,j} \geq 0 \tag{7}$$

Figure 5

|  | Normalized DBW w.r.t. upper bound | |
|---|---|---|
| # Racks | SM-PCFT | GM-PCFT |
| 64 | 0.96 | 0.84 |
| 128 | 0.93 | 0.84 |
| 256 | 0.91 | 0.85 |
| 512 | 0.94 | 0.88 |

Table 1: Efficiency of PCFT Algorithm

Fig. 10

|  | Time (ms) | | | |
|---|---|---|---|---|
| # Racks | Full-LP | Greedy-LP | FireFly two-step | Optimality Gap (%) |
| 32 | 138 | 110 | 27 | 2.8 |
| 128 | 4945 | 208 | 54 | 2.6 |
| 256 | $1.7 \times 10^6$ | $3.3 \times 10^4$ | 60 | 1.3 |
| 512 | $6.4 \times 10^8$ | $1.9 \times 10^7$ | 68 | 2.8 |

Table 2: Scalability and optimality of FSO network reconfiguration algorithm

Fig. 11

|  | # FSOs per rack | | | |
|---|---|---|---|---|
|  | 36 | 40 | 44 | 48 |
| # SMs per FSO = 10 | 5.14 | 6.07 | 7.47 | 8.83 |
| # SMs per FSO = 13 | 6.21 | 7.27 | 8.20 | 9.17 |
| # SMs per FSO = 15 | 6.45 | 7.54 | 8.31 | 9.25 |
| GM-based network | 6.87 | 7.84 | 8.66 | 9.24 |

Table 3: Average throughput per-server on Uniform10 for varying network parameters

Fig. 12

|  | Equip | | Cable | | Power | | Total | |
|---|---|---|---|---|---|---|---|---|
|  | Fiber | Cu | Fiber | Cu | Fiber | Cu | Fiber | Cu |
| FatTree | 22 | 15 | 8 | 2 | 1 | 2 | 31 | 20 |
| 3DB | 13 | 9 | 5 | 2 | 1 | 1 | 19 | 12 |
| cThru | 13 | 9 | 5 | 2 | 1 | 1 | 19 | 12 |
| FSO Network | 12 | | 0 | | 1 | | 13 | |

Table 4: Cost (in USD millions) of equipment, power, and cabling assuming 512 racks with 48 servers/rack

Fig. 13

RECONFIGURABLE WIRELESS DATA CENTER NETWORK USING FREE-SPACE OPTICS

CROSS REFERENCE TO RELATED APPLICATIONS

This application is a divisional of U.S. application Ser. No. 14/934,863, titled "Reconfigurable Wireless Data Center Network Using Free-Space Optics", filed on Nov. 6, 2015, which in turn claims priority from "Patch Panels in the Sky: A Case for Free-Space Optics in Data Centers", U.S. Provisional Application No. 62/076,064 of Hamedazimi, et al., filed Nov. 6, 2014, the contents of both of which are herein incorporated by reference in their entireties.

BACKGROUND

1. Technical Field

Embodiments of the present disclosure are directed to data center network design and management.

2. Discussion of the Related Art

Data centers (DCs) are a critical piece of today's networked applications in both private and public sectors. The key factors that have driven this trend are economies of scale, reduced management costs, better utilization of hardware via statistical multiplexing, and the ability to elastically scale applications in response to changing workload patterns. A robust datacenter network fabric is fundamental to the success of DCs and to ensure that the network does not become a bottleneck for high-performance applications. In this context, DC network design should satisfy several goals: high performance, such as high throughput and low latency; low equipment and management cost; robustness to dynamic traffic patterns; incremental expandability to add new servers or racks; and other practical concerns such as cabling complexity, and power and cooling costs.

Current DC network architectures do not provide a satisfactory solution, with respect to the above requirements. In particular, traditional static (wired) networks are either (1) overprovisioned to account for worst-case traffic patterns, e.g., fat-trees or Clos networks, and thus incur high cost, or (2) oversubscribed, e.g., simple trees or leaf-spine architectures, which incur low cost but offer poor performance due to congested links. One way to realize a flexible network is to use a "patchpanel" between racks. However, this is infeasible on several fronts: (1) it requires very high fanout and backplane capacity, potentially nullifying the cost benefits, (2) the cabling complexity would be high, and (3) it introduces a single-point of failure. Recent studies have tried to overcome the above limitations by augmenting a static (wired) "core" with some flexible links, such as RF-wireless or optical links. These augmented architecture show promise, but offer only incremental improvement in performance. Specifically, RF-wireless based augmented solutions also offer only limited performance improvement, due to inherent interference and range constraints of RF links. Interference could be eliminated by enabling laser-like directionality in RF links, but this would require antennas or antenna arrays that are a few meters wide. Fundamentally, the challenge here is due to the large wavelengths of RF for commonly used RF bands. In addition, regulations regarding RF bandwidth and transmit power limit achievable data rates. Optical solutions offer high-bandwidth links and low latency, but have limited scalability, limited flexibility, and have a single point of failure. Furthermore, all the above architectures incur high cabling cost and complexity.

SUMMARY

Exemplary embodiments of the present disclosure provide a system and method for a flexible free-space optical inter-rack network in which each top-of-rack (ToR) is equipped with reconfigurable wireless links which can connect to other ToR switches and use Free-Space Optical communications (FSO) for high data rates (tens of Gbps) over long ranges using low transmission power and with zero interference. A centralized controller can reconfigures the topology and forwarding rules to adapt to changing traffic patterns.

According to an embodiment of the disclosure, there is provided a reconfigurable free-space optical inter-rack network, including a plurality of server racks, each including at least one switch mounted on a top thereof, where each top-mounted switch includes a plurality of free-space-optic link connector, each with a free-space optical connection to a free-space-optic link connector on another top-mounted switch, a single ceiling mirror above the plurality of server racks that substantially covers the plurality of server racks, where the single ceiling mirror redirects optical connections between pairs of free-space-optic link connectors to provide a clear lines-of-sight between each pair of connected free-space-optic link connectors, and a controller that preconfigures a free-space optical network connecting the plurality of server racks by establishing connections between pairs of free-space-optic link connectors, and that reconfigures connections between pairs of free-space-optic link connectors in response to network traffic demands and events.

According to a further embodiment, the free-space-optic link connector is a liquid crystal switchable mirror (SM) that is electrically controllable to switch between a reflection mode and a transparent mode.

According to a further embodiment, the controller preconfigures an alignment of each SM to maximize a dynamic bisection bandwidth of a set of all possible candidate links between pairs of SMs.

According to a further embodiment, the dynamic bisection bandwidth is maximized by constructing an n-node random regular graph of degree mk, where n is a number of server racks, m is a number of top-mounted switch per rack, and k is a number of SMs per top-mounted switch, grouping the mk edges on each node into m sets of k edges corresponding to each of the m top-mounted switches, and for every edge connecting a pair of SMs (a, b), aligning one SM each of a and b towards each other.

According to a further embodiment, the free-space-optic link connector is a mirror galvanometer configured to rotate around the axis on a plane of the mirror in response to an electric signal.

According to a further embodiment, the controller preconfigures an orientation of each GM to maximize a dynamic bisection bandwidth of a set of all possible candidate links between pairs of SMs.

According to a further embodiment, the dynamic bisection bandwidth is maximized by, for each top-mounted switch per rack, randomly partitioning the plurality of server racks into disjoint blocks, where for each block B and top-mounted switch a∈B, there exists an orientation of each GM on an ith top-mounted switch of each rack such that all racks in B fall within a coverage cone of the GM, creating a random block-level matching Mi over the blocks, and for each edge $(B_1, B_2) \in M_i$, orienting the GMs on each top-mounted switch i in each rack within block $B_1$ towards $B_2$, where a GM on any top-mounted switch in $B_1$ covers all top-mounted switches on racks in $B_2$.

According to another embodiment of the disclosure, there is provided a method of periodically reconfiguring a free-space optical inter-rack network, the network comprising a plurality of server racks, each including at least one switch mounted on a top thereof, each top-mounted switch including a plurality of free-space-optic link connectors, the method including solving a following integer linear program $$\max \Sigma_{i,j} T_{i,j} \text{ subject to:} \quad (1)$$

$$\forall b: \Sigma_{a \ s.t.(a,b) \in \kappa} l_{a,b} \leq 1; \ \forall a: \Sigma_{b \ s.t.(a,b) \in \kappa} l_{a,b} \leq 1 \quad (2)$$

$$\forall a,b: \Sigma_{i,j} f_{a,b}^{i,j} \leq l_{a,b} \times C \times E \quad (3)$$

$$\forall i,j,k: \Sigma_a \Sigma_{b \in FSOs(k)} f_{a,b}^{i,j} = \Sigma_{b \in FSOs(k)} \Sigma_d f_{b,d}^{i,j} \quad (4)$$

$$\forall i,j: \Sigma_{a \in FSOs(i)} \Sigma_b f_{a,b}^{i,j} = \Sigma_a \Sigma_{b \in FSOs(j)} f_{a,b}^{i,j} = T_{i,j} \quad (5)$$

$$\forall i,j: T_{i,j} \leq D_{i,j} \quad (6)$$

$$\forall (a,b) \in \kappa: l_{a,b} \in \{0,1\}; \forall i,j,a,b: f_{a,b}^{i,j} \geq 0 \quad (7)$$

where subscripts a; b; c; d refer to top-mounted switches, and subscripts i; j; k refer to racks, FSOs(k) denotes a set of top-mounted switches on the top of rack k, $D_{i,j}$ is an estimated traffic volume between a pair of racks (i,j), a is a set of candidate links between pairs of free-space-optic link connectors, C is a uniform link capacity, E is a given epoch size, $l_{a;b}$ is a binary variable that model topology selection and is 1 iff a candidate link (a, b) is active, $f_{a,b}^{i,j}$ is a variable that models traffic flow in terms of a volume of inter-rack traffic between racks i and j routed over the candidate blink (a, b), $T_{i,j}$ is a total traffic volume satisfied for flow (i, j) that maximizes the total demand satisfied across all rack pairs, by selecting active links; and computing flow routes, subject to constraints (2) that each top-mounted switch has at most 1 active link, (3) that a total flow on each link (on average) does not exceed capacity, (4) that flow is conserved for each flow (i, j) and rack k, (5) that a volume of demand is satisfied over the ingress and egress racks, (6) that the volume satisfied for each rack pair is at most the demand, and (7) that bounds on variables $l_{a;b}$ and $f_{a,b}^{i,j}$ are satisfied.

According to a further embodiment, selecting active links includes determining a maximum weighted matching, where each candidate link (a, b) is weighted by the inter-rack traffic demand $D_{i,j}$ between the racks i and j using a Blossom algorithm augmented to incorporate inter-hop traffic by calculating, given a current matching τ, a total reduction in the network footprint $\Sigma_{i,j} D_{i,j}(h_{i,j} - h'_{i,j})$ due to modifying the matching from τ to τ' with an alternative path, where $h_{i,j}$ and $h'_{i,j}$ are the inter-rack distances between racks (i, j) in matchings τ and τ' respectively, where the augmented Blossom algorithm is run until there is no alternating path that can improve the network footprint.

According to a further embodiment, computing flow routes includes calculating $f_{a,b}^{i,j}$ by executing an augmenting-path approach for max-flow algorithms extended to greedily select an augmenting path for a currently unsatisfied commodity until no more augmenting paths can be selected, and converting values of $f_{a,b}^{i,j}$ variables into end-to-end paths.

According to a another embodiment of the disclosure, there is provided a method for an event-triggered reconfiguring a free-space optical inter-rack network, the network comprising a plurality of server racks, each including at least one switch mounted on a top thereof, each top-mounted switch including a plurality of free-space-optic link connectors, the method including determining links ∇ to be deleted and links Δ to be activated in a reconfiguration; accept the reconfiguration if the deletion of links ∇ does not disconnect a global topology of the network, and the reconfiguration does not conflict with any unfinished reconfiguration; updating the global topology of the network and forwarding tables of the network to reflect deletion of links ∇; deactivate links ∇ and activating links Δ; and updating the global topology of the network and forwarding tables of the network to reflect addition of links Δ, where default path rules and a minimum time-interval units between consecutive updates are maintained.

According to a further embodiment, an event that triggers a reconfiguration is one of an elephant flow, where links are activated to create a shorter or less-congested path for the elephant flow, and an overflow of traffic between a pair of racks that exceeds a configuration threshold, where a direct link is activated between the pair of racks, if the activation does not require deactivating recently activated or high utilization links.

According to another embodiment of the disclosure, there is provided a reconfigurable free-space optical inter-rack network, including a plurality of server racks, each including at least one switch mounted on a top thereof, where each top-mounted switch includes a plurality of free-space-optic link connector, each with a free-space optical connection to a free-space-optic link connector on another top-mounted switch, a plurality of ceiling mirrors above the plurality of server racks, where each of the plurality of ceiling mirrors has an area that is smaller than an area of the top of a server rack, where each single ceiling mirror redirects optical connections between one or more pairs of free-space-optic link connectors to provide a clear lines-of-sight between each pair of connected free-space-optic link connectors, and a controller that preconfigures a free-space optical network connecting the plurality of server racks by establishing connections between pairs of free-space-optic link connectors, and that reconfigures connections between pairs of free-space-optic link connectors in response to network traffic demands and events.

According to a further embodiment, the free-space-optic link connector is a liquid crystal switchable mirror (SM) that is electrically controllable to switch between a reflection mode and a transparent mode.

According to a further embodiment, the controller preconfigures an alignment of each SM to maximize a number of pairs of racks that have at least one candidate link therebetween in a set of all candidate links, and minimizing a total area of rectangular overhead mirrors, where a total number of mirrors is less than a predetermined constant r.

According to a further embodiment, the controller preconfigures an alignment of each SM by creating a random simple graph over racks where each rack has mk links, where m is a number of top-mounted switches per rack and k is the number of SMs per top-mounted switch, mapping each pair of server racks to its reflection polygon, where a reflection polygon is, for any pair of racks $R_a$ and $R_b$, a convex hull of reflection points of all possible assigned candidate links connecting a top-rack switch on $R_a$ to a top-rack switch on $R_b$, where reflection point for an assigned candidate link connecting two top mounted switches a and b is the point p on a ceiling where a, b, and p are on the same vertical plane, and p is equidistant from a and b, clustering the reflection polygons by stabbing the reflection polygons using a minimum number of points, where a point stabs a polygon if it lies inside the polygon, where a set of polygons that are stabbed by a same point are assigned to a same cluster.

According to a further embodiment, if a polygon is stabbed by multiple points, the polygon is randomly assigned to one of the corresponding clusters.

According to a further embodiment, the method includes randomly selecting a link ($R_a$, $R_b$) from a set of unassigned links E that has not been already selected, and assigning the selected link to a best pair of top mounted switches on racks $R_a$ and $R_b$, while ensuring that no top mounted switch is assigned more than a maximum number of links allowed per top-mounted switch, where a best pair of top-mounted switches is one that results in a minimum increase of an area of an overhead mirror currently being used to cover the reflection points of already-assigned links in the cluster of ($R_a$, $R_b$), where the steps of randomly selecting a link and assigning the selected link to a best pair of top mounted switches are repeated until all links in set E are assigned.

According to a further embodiment, if ($R_a$, $R_b$) is the first link being considered from its cluster, then the assignment to FSOs is randomly performed.

According to a further embodiment, if a number of clusters exceeds the predetermined number of top-mounted switches, pairs of mirrors are found that minimizes an increase in the total area, and merged.

According to a further embodiment, the free-space-optic link connector is a mirror galvanometer configured to rotate around the axis on a plane of the mirror in response to an electric signal.

According to a further embodiment, the controller preconfigures an orientation of each GM to create a set of candidate links with near-optimal performance over a network of the links while minimizing usage of the overhead mirrors, where there is an orientation of a GM at each top-mounted switch so that all assigned links at the top-mounted switch are covered by the GM.

According to a further embodiment, the controller preconfigures an orientation of each GM by creating a complete simple graph over the plurality of server racks and assigning as many links as possible that connect pairs of top-mounted racks, where a number of assigned links is less than or equal to a maximum possible number of links, partitioning the plurality of server racks into disjoint blocks, where each block of server racks is co-located and sufficiently small to be covered by an appropriately oriented GM on any top-mounted switch in the data center, creating a random block-level matching, for each edge ($B_1$, $B_2$) in a matching, orienting a GM on each rack of block $B_1$ towards a GM on a rack of block $B_2$, where each GM selected for orientation minimizes a sum of distances between reflection points of candidate links in a same matching, where a reflection point for a candidate link connecting two top mounted switches a and b is the point p on a ceiling where a, b, and p are on the same vertical plane, and p is equidistant from a and b, and covering the reflection points on the ceiling with a number of overhead mirrors using a greedy approach where the mirrors are shaped as rectangles, a number of rectangles can be chosen of order p/A, where p is a number of uncovered reflection points covered by a rectangle under consideration and A is an area of the rectangle, where mirrors have an appropriate minimum size based on the density of the points to cover.

According to another embodiment of the disclosure, there is provided a reconfigurable free-space optical inter-rack network, including a plurality of server racks, each including at least one tower mounted on a top thereof, a plurality of switches attached to each tower, where each switch includes a plurality of free-space-optic link connectors, each with a free-space optical connection to a free-space-optic link connector on another switch, where the plurality of free-space-optic link connectors for each switch is attached to the switches for each tower, where the plurality of free-space-optic link connectors are spaced apart from each other, and a controller that preconfigures a free-space optical network connecting the plurality of server racks by establishing connections between pairs of free-space-optic link connectors, and that reconfigures connections between pairs of free-space-optic link connectors in response to network traffic demands and events.

According to a further embodiment, the free-space-optic link connector is a liquid crystal switchable mirror (SM) that is electrically controllable to switch between a reflection mode and a transparent mode.

According to a further embodiment, controller preconfigures an alignment of each SM by generating a random simple graph over racks with a maximum possible number of assigned links, determining locations of towers on the server racks by selecting a location that is ranked based on a total number of already placed towers that are visible from a location under consideration, while ensuring that only a given number of towers are placed on any particular rack, placing switches on the towers at evenly spaced intervals, and prioritizing links and assigning the links in priority order to the switches in a greedy manner, where a priority for each link (a, b) is computed as a total number of pairs of switches that have a clear line of sight and can be used to assign the link (a, b), where the priorities are kept updated, assigning links to switches in decreasing order of priority, where if no such pair of switches with a clear line-of-sight exists, skipping the link and continue to a next link in order of priority.

According to a further embodiment, duplicate links are added between pairs of server racks.

According to a further embodiment, the free-space-optic link connector is a mirror galvanometer configured to rotate around the axis on a plane of the mirror in response to an electric signal.

According to a further embodiment, the controller preconfigures an orientation of each GM by generating a random simple graph over racks with a maximum possible number of assigned links, determining locations of towers on the server racks by selecting a location that is ranked based on a total number of already placed towers that are visible from a location under consideration, while ensuring that only a given number of towers are placed on any particular rack, placing switches on the towers at evenly spaced intervals, and independently orienting each GM by prioritizing the GMs, and orienting the GMs one at a time in priority order, where each GM is oriented to cover a maximum number of server racks.

According to a further embodiment, a GM is prioritized by counting a number of racks that are covered by an orientation of the GM, where a rack is covered by the GM if there is an switch on the rack that has a clear line of sight with the GM, and prioritizing the GM based on their maximum count across all possible orientations.

BRIEF DESCRIPTION OF THE DRAWINGS

FIGS. 2(a)-(c) illustrates an exemplary FSO link design, prototype and performance, according to an embodiment of the disclosure.

FIG. 4 illustrates a PCFT with candidate links (solid and dashed) between FSOs on racks, according to an embodiment of the disclosure.

FIG. 5 illustrates an exemplary integer linear program (ILP) for performing constrained optimization, according to an embodiment of the disclosure.

FIG. 10 shows Table 1, which illustrates the efficiency of PCFT algorithms according to embodiments of the disclosure.

FIG. 11 shows Table 2, which illustrates scalability and optimality of a network reconfiguration algorithm according to an embodiment of the disclosure.

FIG. 12 shows Table 3, which illustrates average throughput per-server on Uniform10 for varying network parameters, according to an embodiment of the disclosure FIG. 13 shows Table 4, which illustrates the cost, in millions of USD, of equipment, power, and cabling assuming 512 racks with 48 servers/rack, according to an embodiment of the disclosure.

DETAILED DESCRIPTION OF EXEMPLARY EMBODIMENTS

Figure 1:
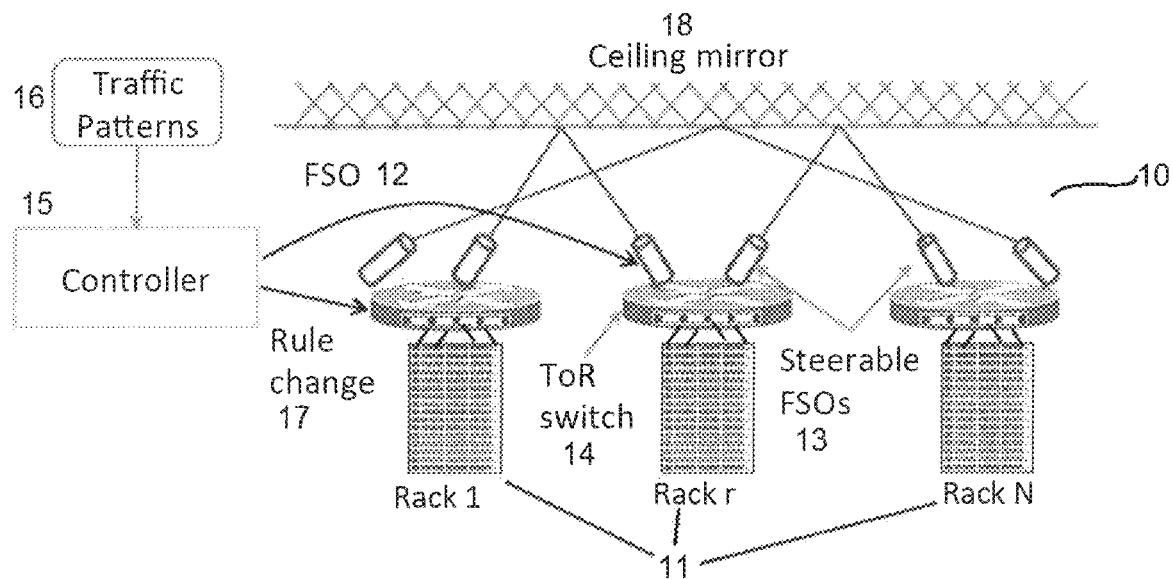
FIG. 1 is a high-level view of a flexible free-space optical inter-rack network architecture, according to an embodiment of the disclosure.

Exemplary embodiments of the disclosure as described herein generally provide systems and methods for flexible free-space optical inter-rack networks. While embodiments are susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure.

Embodiments of the present disclosure provide a DC architecture network design in which: (1) all inter-rack links are flexible; (2) all inter-rack links are wireless; and (3) the core switching backbone is eliminated.

Embodiments can provide unprecedented qualitative and quantitative benefits for DC networks. First, infrastructure cost can be reduced without compromising on performance. Second, flexibility increases the effective operating capacity and can improve application performance by alleviating transient congestion. Third, DC operators are unburdened from dealing with cabling complexity and its attendant overheads, such as obstructed cooling. Fourth, DC operators can experiment with, and benefit from, new topology structures that would otherwise remain unrealizable due to cabling costs. Finally, flexibly turning links on or off can provide energy proportionality.

While prior work made the case for using FSO links in DCs, these fail to establish a viable hardware design and also do not address practical network design and management challenges that arise in reconfigurable designs. Embodiments of the disclosure bridge this gap in the following ways:

Practical Steerable FSO Devices:

Commodity FSO designs are bulky, power hungry, and offer fixed point-to-point links. Embodiments of the disclosure use a small-form factor FSO design using commodity optical devices, along with two alternative steering technologies, switchable mirrors and mirror galvanometers, otherwise known as galvo mirrors.

Network Provisioning:

Given budget and physical constraints, a network hardware according to embodiments of the disclosure can be provisioned to handle unforeseen traffic patterns. A flexible network design can optimize a new notion of dynamic bisection bandwidth. While it is hard to analytically reason about topologies that optimize this metric, random regular graphs are surprisingly good in practice.

Network Management:

A system controller according to an embodiment of the disclosure needs fast and efficient topology selection and traffic engineering algorithms to adapt to changing traffic conditions. However, state-of-art off-the-shelf solvers fail to scale beyond 32-rack DCs. Embodiments of the disclosure use fast heuristics that achieve near-optimal performance. In addition, a system controller according to an embodiment of the disclosure can ensure that performance is not adversely impacted during reconfigurations. Embodiments of the disclosure use simple mechanisms that ensure that the network always remains connected, there are no black holes, and that the per-packet latency is bounded.

According to embodiments of the disclosure, limitations with respect to the use of RF links can be circumvented if a different part of the EM spectrum with much smaller wavelengths is used. In particular, free-space optics (FSO) is a relatively established technology that uses modulated visible or infrared (IR) laser beams transmitted through free space. Laser beams can be very narrow, thus automatically eliminating interference and minimizing path loss. Further, optical spectrum is unregulated and has no bandwidth limitations. Thus, FSO links can easily offer Gbps-Tbps bitrates at long distances (several kms) using relatively low transmit power. TeraHertz wireless technology may be another alternative, but it is much less mature at this time.

Building on the previous insights, a flexible free-space optical inter-rack network according to an embodiment of the disclosure uses a fully-flexible interrack fabric enabled by wireless FSO links. According to embodiments, traditional wires are used for intra-rack connections, and an out-of band control network is used to configure the ToR switches and the FSO devices. According to an embodiment of the disclosure, a fully-flexible interrack network can yield near-optimal bisection bandwidth even without any core (non-ToR) switches. Further, according to an embodiment of the disclosure, a coreless fully-flexible architecture can yields near-optimal performance when the number of flexible ports is equal to the number of servers per rack.

FIG. 1 is a high-level view of a flexible free-space optical inter-rack network architecture 10, according to an embodiment of the disclosure. The network 10 includes a plurality of racks 11 Rack1, . . . , Rack r, . . . , Rack N connected by reconfigurable free space optic FSO links 12 based on steerable FSO connectors 13 mounted on top-of-rack (ToR) switches 14. A ceiling mirror reflects the FSO links 12 to other steerable FSO connectors 13. The network 10 can be initialized or preconfigured by a controller 15, and the controller 15 can issue rule changes 17 to reconfigure the network based on traffic patterns 16.

FSO Links:

According to embodiments, each ToR is equipped with a number of steerable FSO devices. The FSO devices export APIs to the controller for reconfiguration. The space above the racks is used to establish an obstruction-free optical path. To ensure that the FSO devices do not obstruct each other, ceiling mirrors can be used, as shown in FIG. 1. The requirements of such mirrors are quite minimal so long as they reflect IR and many conventional mirrors work sufficiently well (§ 3). The ceiling mirror need not be a single piece, and small unevenness in the mirrors is unlikely to be an issue due to the misalignment tolerance of the FSO links (§ 3.1).

Network Provisioning:

In the limit, there may be a very large number of FSO devices per ToR. In practice, however, there are physical and geometric constraints. For instance, FSO devices will have a finite size that constrains the number of such devices per ToR. Thus, a netword according to an embodiment needs to be provisioned or preconfigured so that it is robust to future (and unforeseen) traffic patterns.

Network Management:

A controller according to an embodiment can dynamically select a runtime topology and configure forwarding paths, based on prevailing traffic demands and events. Software-defined networking (SDN) capabilities can be used for data plane reconfiguration. Each SDN-capable ToR switch can report observed traffic demands to the controller.

Practical Steerable FSO Design

According to embodiments of the disclosure, to deploy a flexible free-space optical inter-rack network in a DC, the FSO devices should have a small form factor, so many devices can be packed on each ToR, be low-cost commodity devices with low power footprint relative to switches, and be steerable to enable flexibility.

However today's commercial FSO devices are bulky, expensive, and power-intensive.

Achieving robust links at high data-rates and long ranges typically requires powerful lasers and expensive mechanisms for dynamic alignment for outdoor use. Furthermore, conventional FSO deployments provide fixed point-to-point links and do not focus on steerability.

Embodiments of the disclosure can repurpose commodity DC-centric optical networking gear to establish robust and sufficiently long FSO links in a DC, and can leverage existing commodity optical technologies to steer the FSO beam with high precision and low latency.

Figure 2A:
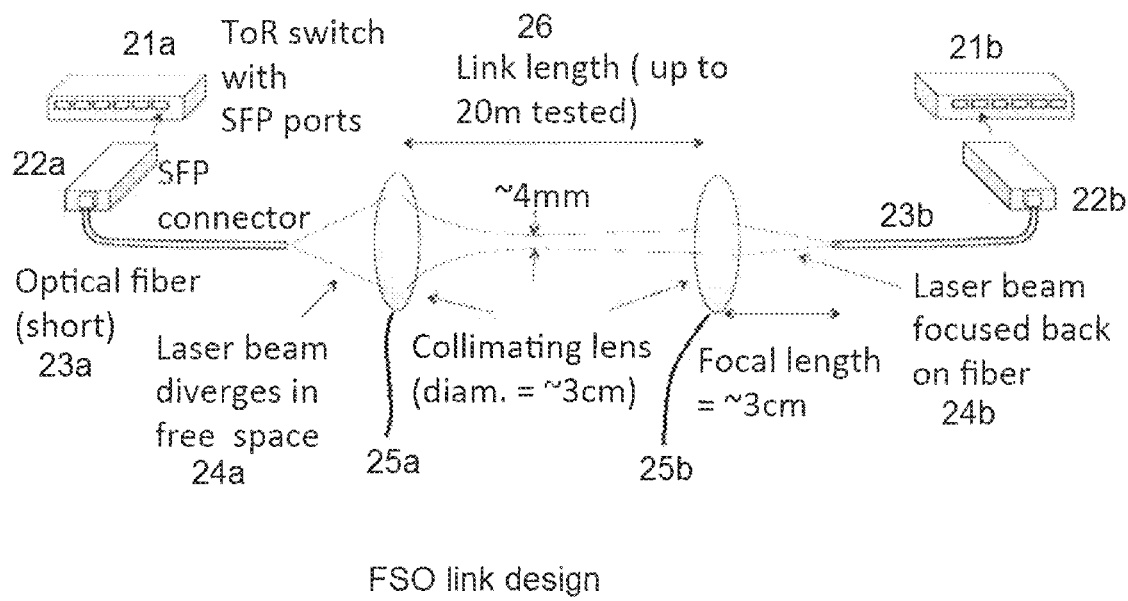

FIGS. 2(a)-(c) illustrates an exemplary FSO link design, prototype and performance, according to an embodiment of the disclosure. FIG. 2(a) illustrates optical path and networking gear. Each end of an FSO link is a ToR switch with a plurality of optical SFP (small form-factor pluggable) ports, an SFP connector and an optical fiber connected to an SFP port. A laser beam diverges from the optical fiber into free space, and is collimated by a lens and transmitted to another collimating lens, which converges the optical signal back to an optical fiber connected to another SFP connected and ToR switch. An exemplary collimating lens is about 3 cm. in diameter and has a focal length of about 3 cm., and the laser link between collimating lenses is about 4 mm in diameter. The length of the optical link between collimating lenses may be up to 20 m. FIG. 2(b) depicts one end point of a 10 Gbps link prototype running in a DC over a 20 m link, and the inset shows a zoomed in version. The figure shows the optic fiber connecting to a lens, and beam 26 being received by mirror 27. The FSO link connects to a similar set up on the other end. FIG. 2(c) illustrates a distribution of per-sec TCP throughputs on a 10 Gbps FSO link over ~20 m on an optical bench (Lab) and DC racks (DC), over days of continuous runs. A throughput distribution on a wired optical fiber is shown for comparison.

FSO Link Engineering

Embodiments of the disclosure can provide an FSO optical link using commodity DC-grade optical networking equipment that can achieve high data rates, at ranges sufficient for DC-scale deployment, and with sufficient (mis) alignment tolerance. In particular, the additional overheads in commercial FSO devices can be avoided as concerns about outdoor environmental factors largely disappear in the indoor controlled DC setting. However, an optical path according to an embodiment should be designed to balance the tradeoff between the laser beam divergence and misalignment tolerance, as described below.

An FSO system according to an embodiment is engineered by coupling two optical fiber end points directly with a free-space link without any opto-electric conversion, thus saving on power and cost. This fiber-FSO-fiber link connects to standard optical interconnect technology widely used in DCs, such as 10GBASE-SR. An exemplary, non-limiting example of this interface is an optical SFP (small form-factor pluggable), or a variant such as SFP+.

Embodiments of the disclosure uses optical designs on both ends: (1) on the transmitter side, where the fiber 'launches' the laser beam in free space, and (2) on the receiver side, where the laser beam is received into the fiber, as shown in FIG. 2(a). Normally, when the laser beam comes out of the fiber into free space it diverges with a significantly large angle. To minimize divergence, the beam can be collimated using a suitably designed lens located at its focal length from the transmitting fiber endpoint. A similar lens near the receiving fiber end point focuses the beam back to the fiber.

An above optical design according to an embodiment can ensure that the laser beam maintains a sufficient width to tolerate minor misalignments due to rack vibrations and other effects. However, this presents a tradeoff: wider beams can tolerate misalignments better, but suffer from a poorer power density at the receiving end. A design according to an embodiment uses optical SFPs for long range fiber communications, such as, 10GBASE-LR, and highly sensitive detectors that can work with very little received power.

According to embodiments, the lens is small (about 3 cm diameter) with focal length about the same. Even considering additional hardware, such as mounts or adapters, the footprint of the assembly is about 5 cm across. The costs are also modest when procured in volume: ~$50 for the lens and $50 for the assembly. There may be additional costs for using an optical SFP (~$100), if optical wired links are not already used. Finally, there is no additional power burden beyond the SFP power consumption as a design according to an embodiment does not add any new opto-electronic conversion.

A prototype according to an embodiment of the disclosure uses both 1 Gbps and 10 Gbps links with very similar optical setups. The prototype links use 1000BASE-LX (1GBASE-LR) SFP (SFP+) for the 1 Gbps (10 Gbps) case and multi-mode fibers for their larger diameter. The collimated laser beam maintains a ~4 mm diameter after it converges. To obtain a 20 m length on a small optical bench, the beam path is reflected multiple times via mirrors. This also validates use of mirrors on the optical path and shows that optical loss due to reflections is low.

Note that typical optical SFPs require two fibers and thus two optical paths for duplex communication. However, single fiber SFPs that use WDM principles to multiplex both links on a single fiber are beginning to be available. Embodiments of the disclosure use such SFPs for 1 Gbps experiments, but due to unavailability of such devices for 10 Gbps, use fiber for the return path for the 10 Gbps experiments.

According to embodiments, link performance can be tested by running continuous TCP transfers over an FSO link for several days at a time for several selected link lengths with the set up on the optical bench. The results are very similar for different lengths. For brevity, FIG. 2(c) reports only the results for the longest tested case (~20 m) for the 10 Gbps link. Note that the distribution of TCP throughputs is almost identical to that observed over regular fiber links, demonstrating no additional loss in the FSO links. To study misalignment tolerance, transmitter side set up is shifted in small incremental steps using a translating mount perpendicular to the beam axis keeping the receiver side fixed. No throughput loss was seen until a 6 mm shift, beyond which the link becomes unstable. This 6 mm tolerance is sufficient to handle minor misalignments due to rack vibrations and environmental issues in a DC.

According to embodiments, to understand the link performance "in the wild," the link can be set up in a production (university run) DC environment. Unlike the optical bench, this real environment has several differences that can produce misalignments: (1) racks experience vibrations due to several factors, such as server fans, discs, HVAC and UPS units, and (2) the beam could 'wander' due to fluctuating air density caused by temperature variations. According to an embodiment, the FSO link was set up with the optical components placed on top of the rack using magnetic bases. Two racks are used at ~20 m apart, as shown in FIG. 2(b). Mirrors are used on the beam path—one on each end—for ease of alignment. According to embodiments, these mirrors can be viewed as proxies for mirrors to be used in steering. Alignment can be manually performed with the help of an infra-red viewer. A TCP transfer experiment according to an embodiment is run continuously over several days. The statistics of per-sec TCP throughput is almost identical to the optical bench and wired cases, as illustrated in FIG. 2(c). The average TCP throughput is ~9:3 Gbps—note that no commodity RF technology exists in small-form factor that can deliver such throughput at 20 m range.

A design according to an embodiment can provide a low-cost, commoditizable, and small-form factor FSO link at high data rates over ranges sufficient for DC scale. Experiments suggest that the link is likely robust to realistic (mis)alignment concerns due to environmental effects in DCs.

Developing Steering Mechanisms

Having established the viability of a point-to-point FSO link using commodity optics, embodiments can make the beam steerable to enable flexibility. Embodiments can provide two solutions that can be commoditized: switchable mirrors and galvo mirrors. It is to be understood that these are not necessarily optimal in any sense or that these are the only alternatives. There are a variety of other beam steering approaches, but they are not off-the-shelf technologies. Both solutions offer different tradeoffs with respect to latency, degree of flexibility, and cost/power, and at this time, no one solution is strictly better.

Figure 3A:
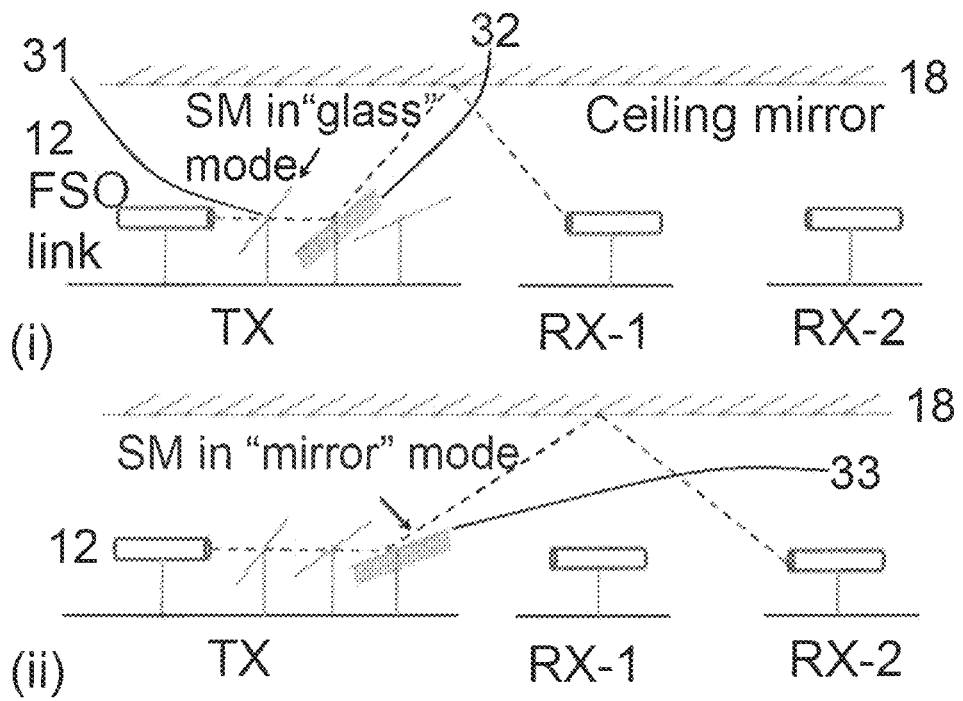
FIGS. 3(a)-(b) illustrates the use of switchable mirrors (SMs) and mirror galvanometers, otherwise known as galvo mirrors (GMs), with FSOs, according to an embodiment of the disclosure.
Figure 3B:
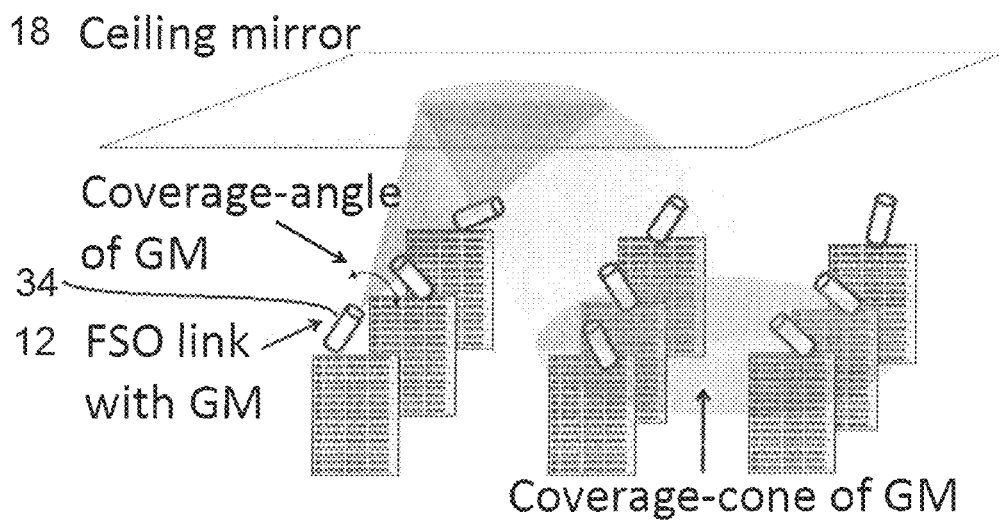

FIG. 3(a) illustrates the use of switchable mirrors (SMs) with FSOs: FIG. 3(a)(i) depicts a transmitter TX with an FSO link 12, a $1^{st}$ SM 31 in glass mode and a 2nd SM 32 in mirror mode to reflect a beam from the ceiling mirror 18 to receiver RX-1; FIG. 3(a)(ii) depicts a 3rd SM 33 in mirror mode, reflecting a beam from the ceiling mirror 18 to receiver RX-2. Receivers also have SMs aligned to direct the beam to its detector, not shown for clarity. FIG. 3(b) illustrates a galvo mirror 34 (GM) on an FSO device 12, and illustrates the coverage angle and coverage cone of a GM as reflected from the ceiling mirror 18. FIG. 3(b) shows that a GM can steer the beam within its coverage-cone.

Switchable Mirrors (SMs).

According to embodiments, switchable mirrors (SM) can be made from a liquid crystal material that can be electrically controlled to rapidly switch between reflection (mirror) and transparent (glass) states at millisecond timescales.

According to embodiments, each FSO device can have multiple SMs, with each SM aligned during a pre-configuration step to target a point on a ceiling mirror and thus, a receiving FSO. The link is established by switching one of the SMs to the mirror state, while leaving the rest in a transparent state.

SMs directly satisfy design needs of an embodiment. It can be miniaturized as it only needs to be slightly larger than the beam diameter: 1 cm² is sufficient. A SM of this size is expected to have low cost (<$5) at volume. Power consumption is also low: only 40 mW for the stated size. According to an embodiment, the reconfiguration latency was evaluated using an off-the-shelf 12"×15" SM, and it is 250 msec. The switching latency decreases with the decrease in the surface area, and is estimated to be about 10-20 msec latency for a 1 cm² SM size envisioned for an embodiment.

Galvo Mirrors (GMs)

Galvo mirrors (GMs) are typically used in laser scanning applications. Here, a small mirror, a few mm across, can rotate (up to specific angular limits) around an axis on the plane of the mirror in response to an electrical signal. The laser beam can be reflected from this mirror. The mirror rotation deflects the reflected beam by a specified angle depending on the signal. Using a pair of such mirrors at right angles can steer the beam within a desired rectangular cone. According to an embodiment, an FSO device equipped with a GM can target any receiver within a pre-configured rectangular cone chosen offline, as shown in FIG. 3(b).

According to an embodiment, the response parameters of GMs were evaluated using an off-the-shelf GM using the setup shown in FIG. 3(b). The mirror rotation is controlled programmatically changing the applied voltage. Here, two detectors receive the reflected beam from the mirror alternately as the mirror is fed by a square wave (100 Hz) from a function generator. The time between the instant the voltage trigger is initiated via the square wave generator and the time the mirror settles to its new position is measured. Tests indicate that the steering latency is linear with respect to the steering angle and ~0.5 ms even for angles up to about ±20°. The pointing error was measured to be ≤10 μrad, which translates into ~1 mm positioning error at 100 m, which is well within a 6 mm tolerance of the FSO link.

A GM is inexpensive (~$100) and small (a few inches across). But, off-the-shelf GMs have a somewhat higher average power consumption (7 W measured) due to the use of an electro-mechanical system. That said, MEMS-based scanning mirrors that provide the same functionality as GMs are already being commoditized and can reduce the power to a few miliWatts.

Design Summary

A device according to an embodiment of the disclosure can have: (1) a rough form factor of about 3"×6"; (2) a range of ~100 m and a misalignment tolerance of about 6 mm; (3) a power footprint of about 3 W (most of this is in SFP, assuming MEMS-based GMs); and (4) an estimated per-port cost of about $300 ($100 for the SFP and $200 for the FSO+steering when produced in volume). The two steering mechanisms impose different constraints and tradeoffs for a flexible free-space optical inter-rack network design according to an embodiment of the disclosure. In particular, having k SMs at an FSO can switch the FSO beam between a set of k arbitrarily chosen but pre-aligned receivers, while a GM on an FSO can steer the beam to any receiver within the coverage-cone that the GM has been pre-oriented to target.

Network Preconfiguration

According to an embodiment, there are two network design situations that occur at different timescales:

First, the network hardware should be provisioned, e.g., how many FSOs, etc., and also the SMs/GM should be pre-aligned/pre-oriented at each FSO. This can be performed offline in an initialization or pre-configuration phase.

Second, given an initialized, pre-configured network, a network according to an embodiment should be reconfigurable in near real-time to implement a runtime topology suited for the current traffic.

The first situation of preconfiguration is described in this section, and the second situation of reconfiguration is described in the next section. According to an embodiment of the disclosure, a dense preconfigured network can be created by placing a large number of FSO devices on each rack, with each FSO device equipped with several SMs or high-coverage GMs, subject to physical limitations, e.g., the size/cost of the FSO devices, size of SM, angle of GMs etc. An embodiment of the disclosure can provide a high performance DC network within these size and cost constraints.

Preliminaries and Objective

Consider a network according to an embodiment, i.e., a set of FSOs on each rack with pre-aligned SMs or pre-oriented GMs. A candidate (bi-directional) link can be established between a pair of FSOs a and b if (1) a has an SM aligned towards b and vice-versa or (2) a is located in the coverage-cone of the GM at b and vice-versa. At any instant, only one candidate link per FSO can be an active link. For example, in FIG. 3(a), links (TX, RX-1) and (TX, RX-2) are candidate links, and link (TX, RX-1) is active in FIG. 3(a)(i) while (TX, RX-2) is active in FIG. 3(a)(ii). According to an embodiment, the set of all candidate links can be referred to as a dynamic graph, or alternatively, the pre-configured flexible topology (PCFT). According to an embodiment, given a PCFT, a set of candidate links that can be active simultaneously can be referred to as a realizable topology. Note that the only constraint on a set of links to be active simultaneously is that each FSO has at most one active candidate link incident on it, due to lack of wireless interference. Thus, any realizable topology is matching in a PCFT graph over the FSOs and vice-versa.

FIG. 4 illustrates a PCFT with candidate links (solid and dashed) between FSOs on racks RACK-1, RACK-2, RACK-3, and RACK-4. The set of solid links represents one possible realizable topology ($\tau 1$), and the set of dashed lines represents another ($\tau 2$).

Metric of Goodness

According to an embodiment, if an expected set of traffic demands are known, then a customized PCFT that is optimal for this set can be designed. However, DC workloads are variable and unpredictable. Thus, according to an embodiment, there should be a metric to quantify the performance of a PCFT that is analogous to a traditional notion of high bisection bandwidth that captures the throughput of a network for arbitrary traffic patterns. More formally, given a topology t and considering all possible partitions P of t into two equi-sized sets of racks, the bisection bandwidth is defined as $\min_{p \in P} BW(t,p)$, where $BW(t,p)$ is the cut-size in I corresponding to p. However, bisection bandwidth only applies to a static topology, and is not meaningful for a flexible network. In a flexible free-space optical inter-rack network according to an embodiment of the disclosure, the topology t itself can be changed on demand, which the bisection bandwidth metric fails to capture.

According to an embodiment, a new notion of dynamic bisection bandwidth (DBW) is introduced as the metric of goodness to evaluate a PCFT. According to an embodiment, a dynamic bisection bandwidth of a PCFT Π can be defined as follows. Let T be the set of realizable topologies of a given PCFT Π. Then, the dynamic bisection bandwidth (DBW) for a PCFT Π is defined as: $\min_{p \in P} \max_{\tau \in T} BW(t,p)$.

Note that this reflects the ability to choose the best realizable topology t for each given partition p.

To illustrate this, consider the PCFT in FIG. 4 again. Let $\tau_1$ (solid lines) be a static topology; its bisection bandwidth is zero due to the partition {(2,3), (1,4)} of racks. Similarly, the bisection bandwidth of $\tau_2$ (dashed lines) is 2. However, the DBW of the overall PCFT is 4, since $\tau_1$ yields a bandwidth of 4 for all equi-partitions except for {(2,3), (1,4)}, for which $\tau_2$ yields a bandwidth of 4.

Constrained Optimization.

A flexible free-space optical inter-rack network according to an embodiment of the disclosure can provide a PCFT that operates within the given cost and physical constraints and optimizes the DBW. For clarity, the SM and GM embodiments are considered independently. According to embodiment, in each case, an overall budgeted PCFT selection task can be solved in two steps. First, design a PCFT with maximum DBW for a fixed configuration, i.e., fixing the number of FSOs, coverage angle, and number of SMs per FSO. Then, given the price/size constraints, search the space of feasible combinations of these network parameters and pick a feasible PCFT with the highest DBW. Since preconfiguration runs offline, this brute force step is reasonable.

SM-PCFT Design

Task Formulation: Given the number of racks n, number of FSOs m per rack, and the number of SMs k per FSO, the SM-PCFT task is determine the alignments of each SM such that the resulting PCFT has a maximum dynamic bisection bandwidth.

Said differently, an embodiment can provide a PCFT with maximum DBW, under the constraint that the number of candidate links at each FSO is at most k. From this view, the SM-PCFT task falls in the class of network design tasks, but is different from prior work due to the novel DBW objective. For instance, even the special case of k=1, the SM-PCFT task reduces to constructing an m-regular graph over n nodes with maximum (static) bisection bandwidth. Even this simple case is more challenging than the well-studied problem of determining an upper-bound on the bisection bandwidth of m-regular graphs of size n, for which approximate results are known only for very small values of m and n.

Figure 22:
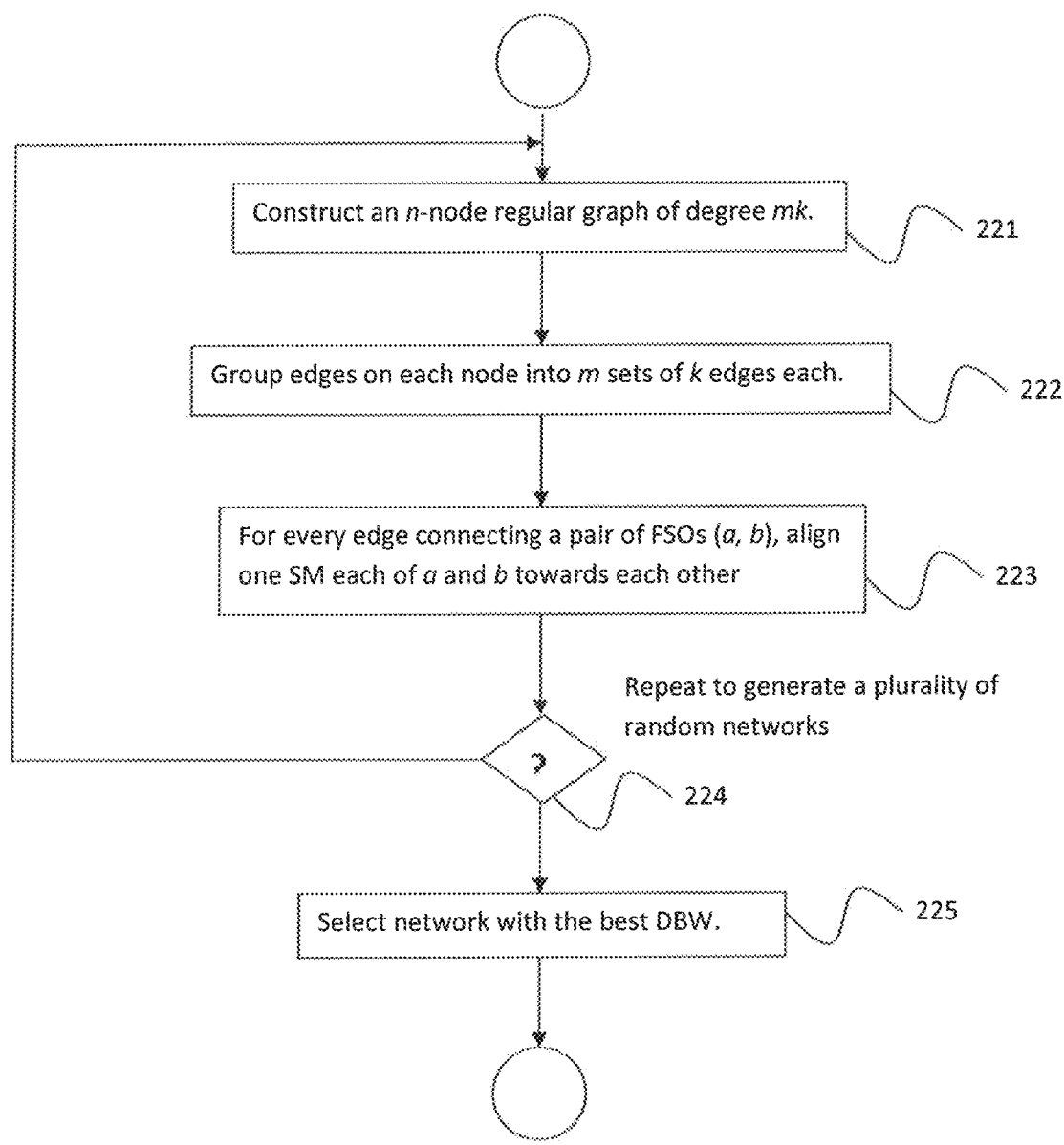
FIG. 22 is a flowchart of a method for constructing an SM-PCFT from a random graph, according to an embodiment of the disclosure.

According to an embodiment, one approach to constructing n SM-PCFT solution is to consider random regular graphs. This is based on the intuition that graphs with (static) bisection bandwidth are likely to have high DBW, because random graphs have near-optimal spectral gap and are good "expanders" with a high static bisection bandwidth. FIG. 22 is a flowchart of a method for constructing an SM-PCFT from a random graph, according to an embodiment of the disclosure. A method starts at step 221 by constructing an n-node regular graph of degree mk, and then at step 222 grouping the mk edges on each node into m sets of k edges each, corresponding to each of the m FSOs. At step 223, for every edge connecting a pair of FSOs (a, b), one SM each of a and b is aligned towards each other. Because of the randomness, there is a small chance of some randomly generated network performing poorly; thus, repeating from step 224, many different random network solutions are generated, and the network solution with the best DBW is selected at step 225.

Note that even computing DBW is challenging. To estimate the DBW for a given random instance, the Kernighan-Lin heuristic for estimating the bisection bandwidth can be used. Experiments suggest this is within 5-7% of the true DBW.

GM-PCFT Design

Task Formulation: Given a DC layout, the number of racks n, number of FSOs per rack m, and uniform coverage-angle of GMs, the GM-PCFT task is to determine the orientation of the GM on each FSO such that the resulting PCFT has the maximum dynamic bisection bandwidth.

Note that a random graph should not be directly used as a GM-PCFT solution, since an FSO a's neighbors in a PCFT should be co-located in a coverage-cone of the GM at a. Thus, according to embodiments, this task imposes certain geometric constraints. In particular, for a pair (a, b) to form a (bi-directional) candidate link in the resulting PCFT, the coverage cone of GM at a covers b and vice-versa. According to an embodiment, a naive approach is to iteratively pick one pair of FSOs (a, b) at a time and orient their GMs towards each other. However, this approach may create only one candidate link per FSO/GM, and hence, could result in a sparse PCFT with poor DBW.

According to an embodiment, a "block"-based approach can be used. The intuition here is to create a random graph at a coarser block granularity, where each block is a group of nearby FSOs that fall within a GM's coverage cone.

Figure 23:
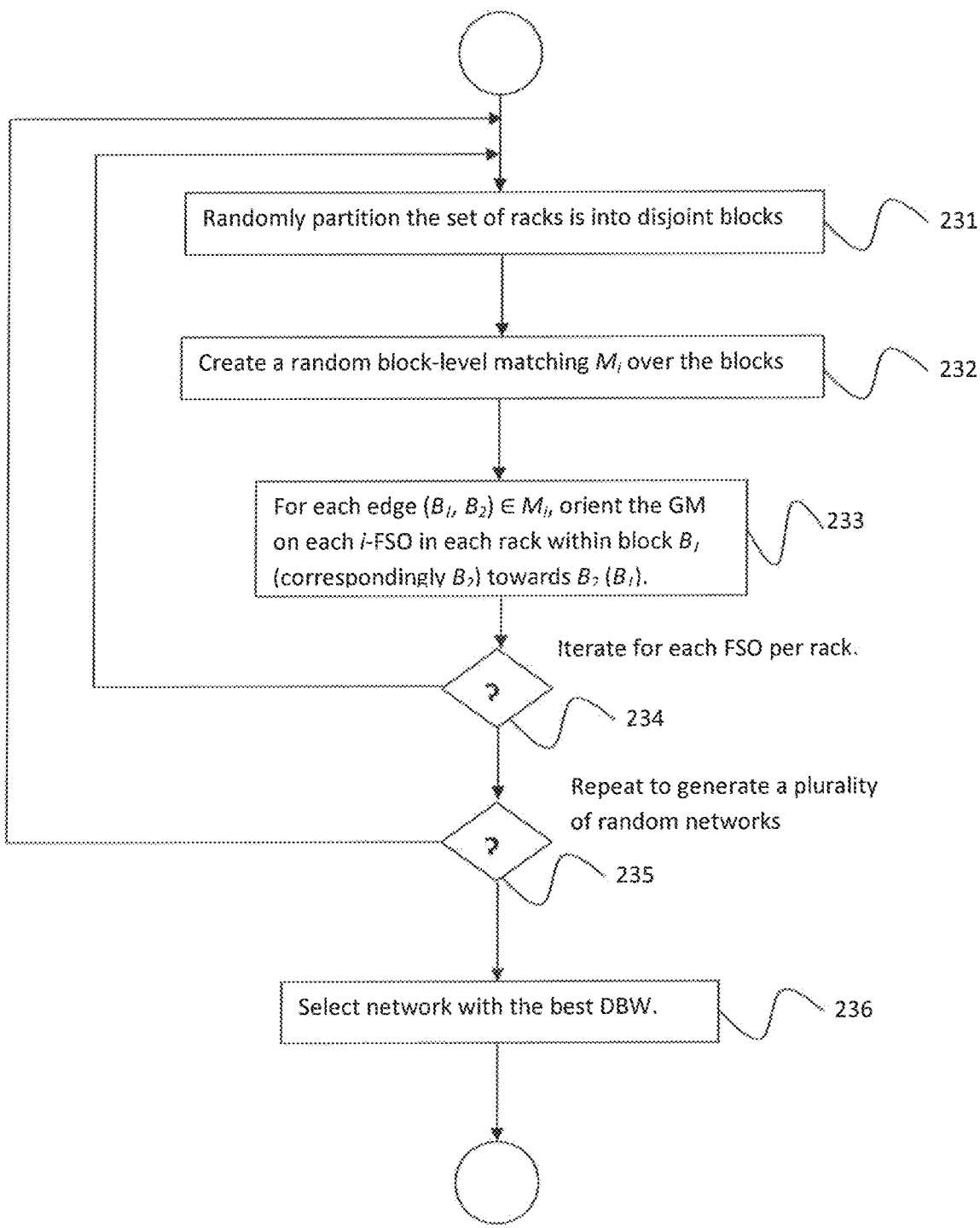
FIG. 23 is a flowchart of a method for constructing a GM-PCFT, according to an embodiment of the disclosure.

A block-based approach according to an embodiment runs in m iterations, one for each FSO per rack, and in each iteration the orientation of the GM is fixed on the ith FSO of each rack, as described below. FIG. 23 is a flowchart of a method for constructing a GM-PCFT, according to an embodiment of the disclosure. Referring to the figure, starting at step 231, in each iteration, the set of racks is randomly partitioned into disjoint blocks, such that each block of racks is co-located and small enough to be covered by a GM, when appropriately oriented, on any FSO in the DC. That is, for each block B and FSO $a \notin B$, there exists an orientation of GM at a such that all racks in B fall within its coverage cone. At first glance, this partitioning requirement may seem complex, but a simple grid-based partitioning scheme is sufficient in practice. Next, at step 232, a random block-level matching M, over the blocks is created. Now, at step 233, for each edge $(B_1, B_2) \in M_i$, the GM is oriented on each i-FSO in each rack within block $B_1$ (correspondingly $B_2$) towards $B_2$ ($B_1$). By construction, the partitioning algorithm guarantees that a GM on any i-FSO in $B_1$ can cover (with some orientation) all i-FSOs on racks in $B_2$. The partitioning is repeated from step 234.

According to embodiments, the partitioning in each iteration i can be different. In particular, random partitioning schemes can be created: starting from the basic grid, a random offset can be performed to create a new partitioning scheme. Finally, as in the case of SM-PCFT, repeating from step 235, many randomized GM-PCFT network solutions are generated, and the best network is selected at step 236.

Real-Time Reconfiguration

According to embodiments, two types of reconfigurations are considered: (1) periodically optimizing the network based on estimated demands; and (2) reconfiguring triggered by certain network events, such as planned migrations or elephant flows.

Periodic Reconfiguration

According to embodiments, given a PCFT and the prevailing traffic load, the periodic reconfiguration task is to optimally select a runtime (i.e., some realizable) topology and set up routes for the current traffic flows.

This constrained optimization is captured by the integer linear program (ILP) shown in FIG. 5. Let K be the set of candidate links in the PCFT, C be the (uniform) link capacity, E be the given epoch size (say a few seconds), and $D_{i,j}$ be the estimated traffic volume between a pair of racks (i, j). This volume can be obtained by using the measurement counters from the SDN switches from previous epoch(s). The subscripts a; b; c; d refer to FSOs, and i; j; k refer to racks, and FSOs(k) denotes the set of FSOs on the top of rack k.

According to embodiments, there can be two sets of control variables: (1) the binary variable $1_{a;b}$ models topology selection and is 1 iff a candidate link (a, b) is chosen to be active; and (2) $f_{a,b}{}^{i,j}$ captures the traffic engineering (TE) strategy in terms of the volume of inter-rack traffic between i and j routed over the link (a, b). Let $T_{i,j}$ be the total traffic volume satisfied for the flow (i,j).

Figure 24:
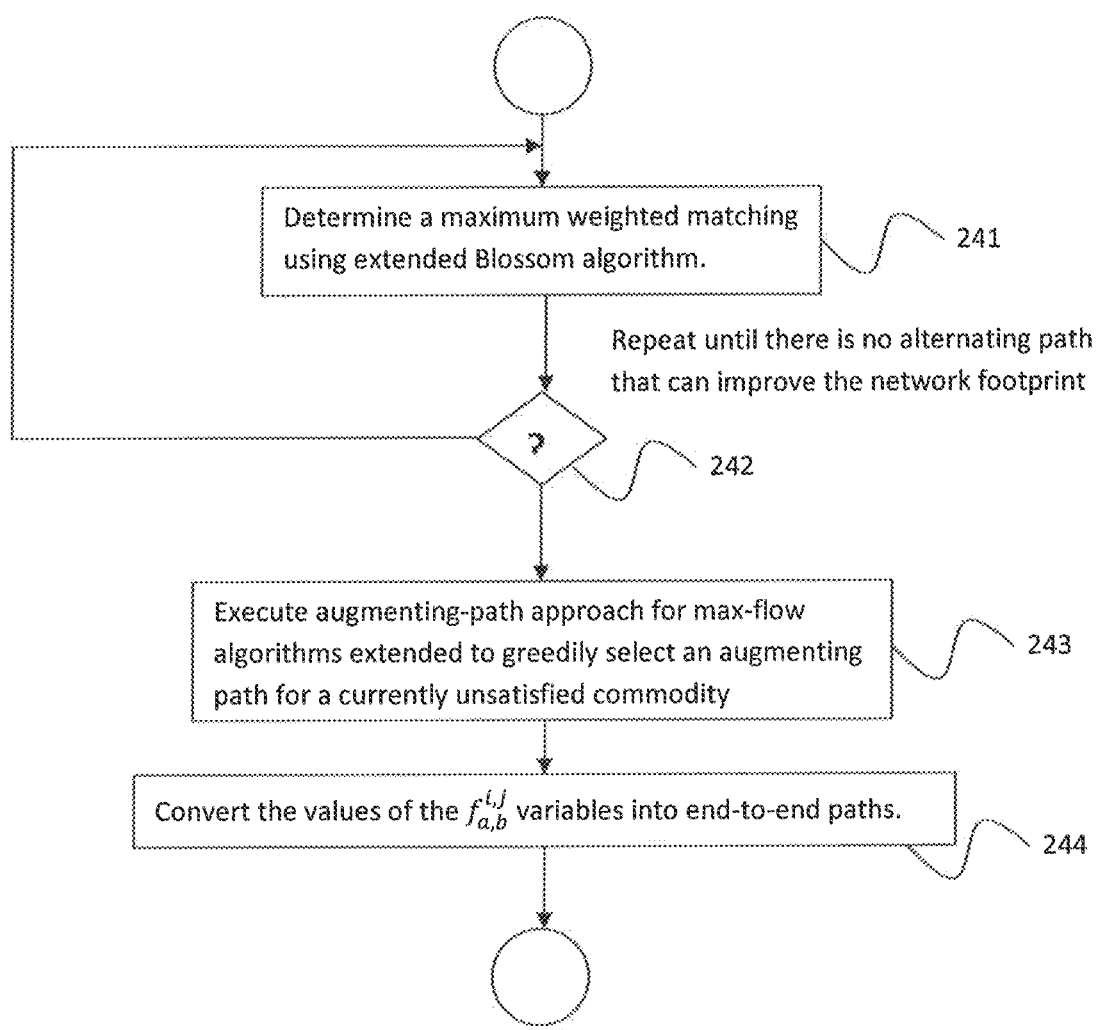
FIG. 24 is a flowchart of a heuristic strategy for solving the LIP of FIG. 5, according to an embodiment of the disclosure.

Referring now to FIG. 5, according to embodiments, for clarity, consider a simple objective function that maximizes the total demand satisfied across all rack pairs as shown in EQ. (1). EQ. (2) ensures that each FSO can have at most 1 active link. EQ. (3) ensures that the total flow on each link (on average) does not exceed the capacity. EQ. (4) are flow conservation constraints for each flow (i,j) and a rack k. EQ. (5) captures the volume of the demand satisfied using a constraint over the ingress and egress racks. EQ. (6) ensures that the volume satisfied for each rack pair is at most the demand. Finally, EQ. (7) imposes bounds on the control variables. However, even state-of-art solvers can take several hours to solve this ILP. Hence, according to embodiments, a heuristic strategy is used and the optimization is decoupled into two stages. First, the "integer" task is solved to select the active links. Then, given this runtime topology, the flow routes are computed. FIG. 24 is a flowchart of a heuristic strategy for solving the LIP of FIG. 5, according to an embodiment of the disclosure.

Recall that a realizable topology is essentially a matching over FSOs in the PCFT graph. Thus, according to an embodiment, a simple starting point is to select the maximum weighted matching, where each candidate link (a, b) is weighted by the inter-rack traffic demand $D_{i,j}$ between the racks i and j. In effect, this maximizes the total demand that can be served using direct links. However, this can be very inefficient if the given PCFT does not have direct links between racks with high traffic demands.

According to an embodiment, the Blossom algorithm for computing a maximum matching can be extended to incorporate multi-hop traffic. Recall that the Blossom algorithm improves matching by computing an alternating path at each stage. According to an embodiment, a new utility function can be defined that captures multi-hop traffic and then the path with the highest benefit is selected. Specifically, since shorter inter-rack paths imply lower resource usage and higher network throughput, the benefit of an alternating path L can be defined as the decrease in the weighted sum of inter-rack distances if L were used to modify the current matching. Referring now to FIG. 24, a heuristic strategy begins at step 241 by determining a maximum weighted matching, where each candidate link (a, b) is weighted by the inter-rack traffic demand $D_{i,j}$ between the racks i and j using a Blossom algorithm augmented to incorporate inter-hop traffic by calculating, given a current matching $\tau$, a total reduction in the network footprint $\Sigma_{i,j} D_{i,j}(h_{i,j} - h'_{i,j})$ due to modifying the matching from $\tau$ to $\tau'$ with an alternative path, wherein $h_{i,j}$ and $h'_{i,j}$ are the inter-rack distances between racks (i, j) in matchings $\tau$ and $\tau'$ respectively, wherein the augmented Blossom algorithm is run until there is no alternating path that can improve the network footprint. The benefit of an alternating path is the total reduction in the network footprint, when seen as graphs over racks.

According to an embodiment, this extended Blossom algorithm can be executed from step 242 until there is no alternating path that can improve the network footprint and then the final topology at this stage is output.

According to an embodiment, given a specific runtime topology, (i.e., values of $I_{a;b}$), the residual traffic engineering task is theoretically solvable in polynomial time as a multi-commodity flow (MCF) task. However, even this can take hundreds of seconds for 256/512 racks, which is not acceptable as a near real-time solution. To address this, embodiments use a greedy algorithm to compute the values of these flow variables. Thus, at step 243, $f_{a,b}{}^{i,j}$ is calculated by executing a traditional augmenting-path approach for max-flow algorithms extended to greedily select an augmenting path for a currently unsatisfied commodity. The algorithm can be run until no more augmenting paths can be picked; i.e., the network is saturated. From this solution, according to an embodiment, the "path stripping" idea can be used, at step 244, to convert the values of the $f_{a,b}{}^{i,j}$ variables into end-to-end paths.

Triggered Reconfigurations

In addition to periodically reconfiguring the network, a flexible free-space optical inter-rack network according to an embodiment of the disclosure can run localized reconfigurations triggered by traffic events. Such reconfigurations may be frequent but likely require minimal topology and flow-route changes. According to embodiments, two types of triggers can be supported. First, if elephant flows that have sent more than 10 MB of aggregate data are detected, then links can be activated to create a shorter or less-congested path for this flow. Second, if traffic between a particular pair of racks exceeds some configurable threshold, then a direct link can be created between them, if this does not require deactivating recently activated or high utilization links.

Correctness During Reconfigurations

According to an embodiment, a network reconfiguration can entail: (1) addition and/or deletion of (candidate) links from the given runtime topology, and (2) corresponding changes to the network forwarding tables (NFTs). This flux can raise concerns about correctness and performance during reconfigurations. Embodiments of the disclosure can ensure that: (1) the network remains connected at all times, (2) there are no black holes, i.e., all forwarding table entries refer to available/usable links, and (3) packet latency remains bounded so that delivery is guaranteed.

According to embodiments, challenges in designing a correct data plane strategy stem from two factors: (1) activation or deactivation of candidate links incur a non-zero latency (few msecs); and (2) reconfigurations may need to be executed concurrently if the triggers occur frequently, e.g., for every elephant flow arrival. At a high level, these are related to the task of consistent updates. However, embodiments can engineer simpler requirement-specific solutions rather than use more general-purpose solutions proposed in prior work.

Handling Sequential Reconfigurations

According to embodiments, to see why "black holes" can arise, consider a reconfiguration that changes the network's runtime topology by steering FSOs a and b towards each other, and in the process activating the link (a, b) and deactivating some link (a, c). Suppose the NFTs change from F to F. Now, there is a period of time when GM/SMs at a is changing state during which neither (a, b) nor (a, c) is available. During this period, irrespective of when the NFTs get updated from F to F', some entries in the NFTs may refer to either (a, b) or (a, c), inducing black holes in the network.

According to embodiments, to avoid black holes, a reconfiguration can be split into multiple steps such that: (1) link deletion is reflected in the NFTs before their deactivation is initiated, and (2) link addition is reflected only after the activation is complete. Thus, according to embodiments, a reconfiguration that involves deactivation (activation) of a set of links $\nabla$ ($\Delta$) can be translated to the following sequence of steps:
S1: Update the NFTs to reflect deletion of $\nabla$.
S2: Deactivate $\nabla$ and activate $\Delta$.
S3: Update the NFTs to reflect addition of links $\Delta$.

According to an embodiment, an additional invariant is that every switch has a default low priority rule at all times to reach every destination rack via some active outgoing link. This can explicitly ensure that packets reach their destination, possibly on sub-optimal paths, as long as the network is connected (see below).

To ensure network connectivity at all times, an embodiment can reject reconfigurations that might result in a disconnected network in step S1 above. That is, we add a step S0 before the three steps above.
S0: Reject the reconfiguration, if deletion of links V disconnects the network.

To reduce the chance of such rejections, a reconfiguration algorithms according to an embodiment can be extended to retain a connected subnetwork from the prior topology. The high-level idea here is to construct a rack-level spanning tree using the current graph, and explicitly remove these links/FSOs from consideration during the greedy matching step.

Figure 6:
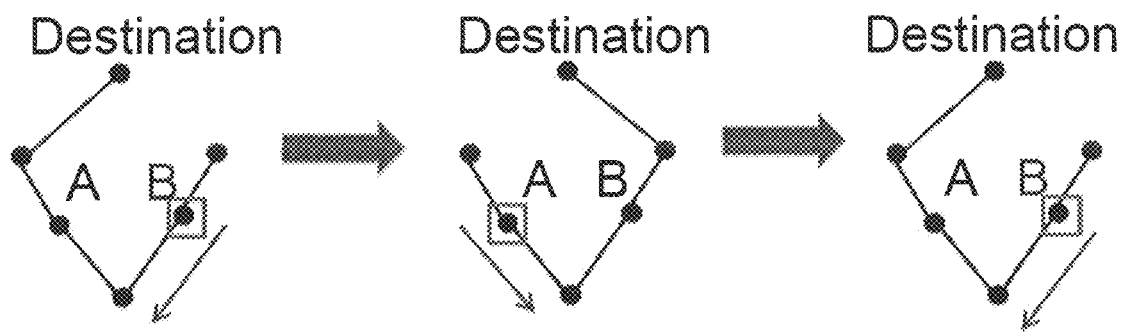
FIG. 6 shows a simple example where a packet can never reach its destination because the links/routes are being rapidly reconfigured, according to an embodiment of the disclosure.

If reconfigurations occur at a very high frequency, then there may be an unbounded packet latency. FIG. 6 shows a simple example where a packet can never reach its destination because it swings back and forth from B to A, because the links/routes are being rapidly reconfigured.

According to embodiments, such cases can be avoided by delaying or rejecting reconfigurations to allow the in-flight packets to use one of the intermediate topologies to reach its destination. A small delay of x units can be introduced between two consecutive NFTs-updates, where x is the maximum packet latency in a fixed realizable topology. This ensures that each packet "sees" at most two configurations during its entire flight. This, bounds the packet latency by (2x+z) where z is the total NFTs-update time.

Handling Concurrent Reconfigurations

According to embodiments, computing and executing a reconfiguration can take a few tens of msecs in a large DC. To achieve good performance, the network may need to be reconfigured frequently, e.g. for every elephant flow arrival in the network, which may happen every msec or less. Thus, embodiments can provide mechanisms that allow reconfigurations to be executed concurrently. To handle concurrent reconfigurations, an approach for sequential reconfiguration should handle two concerns.

Connectivity: One concern is that each reconfiguration in isolation may not disconnect the network but combining them might. Thus, to ensure network connectivity, a controller according to an embodiment maintains an atomic global topology variable G, and uses this variable to accept/reject in step S0. G can be updated by accepted reconfigurations in S1 and S3.

Conflicting reconfigurations: In step S0, a reconfiguration can be rejected that "conflicts", in terms of link activations or deactivations with already-accepted but yet-unfinished reconfigurations. That is, according to embodiments, a non pre-emptive strategy can be followed of allowing outstanding reconfigurations to complete.

According to embodiments, no other changes are required to handle concurrency. Black holes can be avoided since only non-conflicting reconfigurations are executed concurrently and packet latency is bounded since a minimum time-interval already precludes concurrent processing of different NFTs-updates.

Overall Scheme

Figure 25:
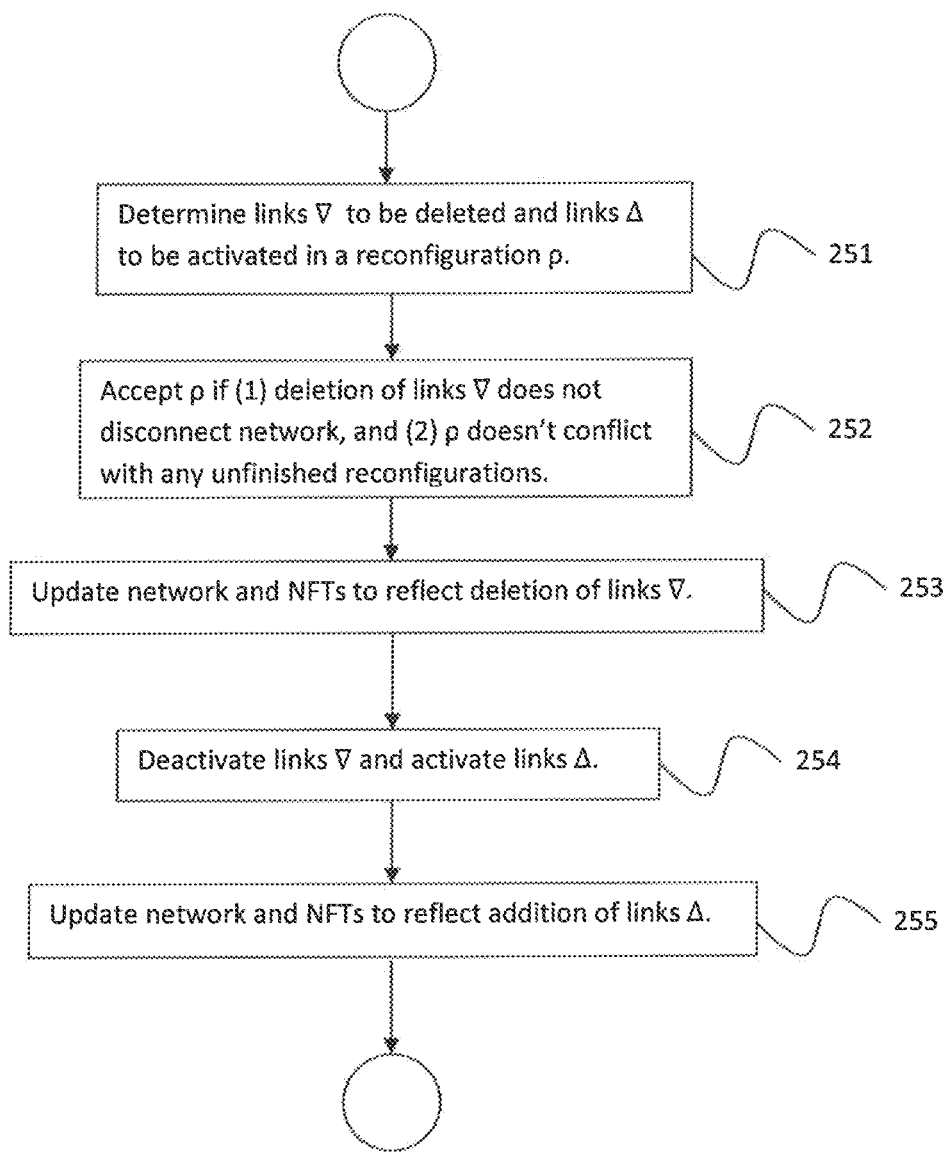
FIG. 25 is a flowchart of an overall scheme for performing concurrent reconfigurations according to an embodiment of the disclosure.

Based on the previous building blocks, an overall scheme for performing concurrent reconfigurations according to an embodiment of the disclosure is as follows, as illustrated in the flowchart of FIG. 25. Each reconfiguration $\rho$ that deletes and adds a set of links $\nabla$ and $\Delta$, is translated into the following steps. Here, G is as described as above.

Step 251: determine links $\nabla$ to be deleted and links $\Delta$ to be activated in a reconfiguration $\rho$.
Step 252: Accept $\rho$ if (1) deletion of links $\nabla$ does not disconnect G, and (2) $\rho$ doesn't conflict with any unfinished reconfigurations.
Step 253: Update G and NFTs to reflect deletion of $\nabla$.
Step 254: Deactivate $\nabla$ and activate $\Delta$.
Step 255: Update G and NFTs to reflect addition of links $\Delta$.

In addition, embodiments ensure that (a) default path rules, and (b) a minimum time-interval (=maximum packet latency) units are maintained between consecutive NFTs-updates.

According to embodiments, it can be proven that the above overall scheme ensures that (1) there are no black holes, (2) network remains connected, and (3) packet latency is bounded by (2x+z), where z is the NFTs-update time. This claim holds irrespective of how the NFTs are updated across the network; i.e., atomic updates are not required.

Controller Implementation

A controller according to an embodiment of the disclosure can be implemented as modules atop a POX controller. According to embodiments, a POX/OpenFlow is used for ease of prototyping. Custom C++ modules are used for the PCFT generation and reconfiguration optimization algorithms. For reconfiguration, heuristics are implemented to "dampen" reconfigurations by checking if there is a significant, e.g., more than 10%, improvement in the objective function from FIG. 5. A simple translation logic is used to convert the output of the optimization solver to OpenFlow rules where the "flow" variables are mapped to prefix-range based forwarding entries. For elephant flows, exact match flow rules can be set up. According to embodiment, existing OpenFlow measurement capabilities are used to estimate the inter-rack demands and use the observed traffic from the previous epoch as the input to the controller.

Evaluation

A flexible free-space optical inter-rack network according to an embodiment of the disclosure can be evaluated with respect to:
1. System performance with respect to other DC architectures;
2. Performance during reconfigurations;
3. Optimality of the preconfiguration algorithms;
4. Optimality and scalability of reconfiguration;
5. Sensitivity analysis with respect to degree of flexibility and reconfiguration latency; and
6. Cost comparison w.r.t. prior DC architectures.

According to embodiments, for (1), a combination of detailed packet-level simulations using htsim can be used and augmented with larger-scale flow-level simulations using a custom flow-level simulator. For (2), a detailed system-level emulation using MiniNet can be used. For (3) and (4), offline trace-driven evaluations are used. For (5), a flow-level simulation is used. Finally, for (6) public cost estimates and projections can be used.

System Performance

Setup and Workloads: According to embodiments, three classes of architectures are considered: (1) a free-space optical inter-rack network according to an embodiment, with both SM and GM, with 10 Gbps links, (2) a wired 10 Gbps full-bisection bandwidth network such as FatTree, and (3) augmented architectures such as c-Through and 3D Beamforming (3 DB) with a 5 Gbps (i.e., 1:2 oversubscribed) core. By default, a network according to an embodiment has 48 FSOs per rack with each equipped with 10 SMs; assume a rack size of 4'×2', which is sufficient to easily hold 48 FSO devices. An overall reconfiguration latency of 20 msecs was assumed for a network according to an embodiment, and conservatively use zero latency for c-Through/3 DB. ECMP routing was used for FatTree and backbone cores of 3 dB and c-Through, and the "overflow" traffic was routed to their augmented links. Finally, a network according to an embodiment uses routing strategies described above.

Following prior work, synthetic traffic models based on DC measurements are used. As a baseline, a Uniform model is considered where flows between pairs of racks arrive independently with a Poisson arrival-rate $\lambda$/s, with an empirically-derived flow size distribution. $\Lambda$ is used as a knob to tune the level of network saturation. Based on prior observations, the Hotspot model was considered, where in addition to the Uniform baseline, a subset of rack pairs have a higher arrival rate $\lambda_2$ and a fixed large flow size of 128 MB. For Uniform loads, the label Uniform X is used where X is average load per server (in Gbps) by choosing suitable $\lambda$. For Hotspot loads, the label Hotspot(Y,X) is used where Y is the % of racks that are hotspots and X is the additional average load on each hotspot server; all Hotspot workloads use Uniform 5 as the background traffic.

Performance Comparison: According to embodiments, there are two metrics here: (1) the average throughput per server, and (2) flow completion time (FCT). For ease of visualization, error bars over multiple runs are not shown, since the results were consistent across multiple runs. GM results according to embodiments are not shown, since they are similar to the SM results.

Figure 7A:
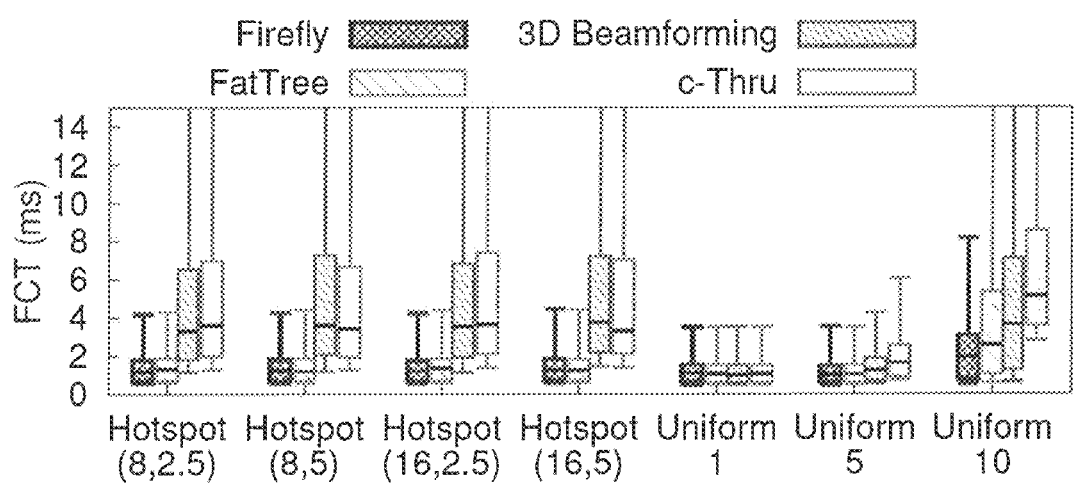
FIGS. 7(a)-(c) show flow completion times (FCT) and average throughput per-server using the htsim simulator on a 64-node topology for different workloads, according to an embodiment of the disclosure.
Figure 7B:
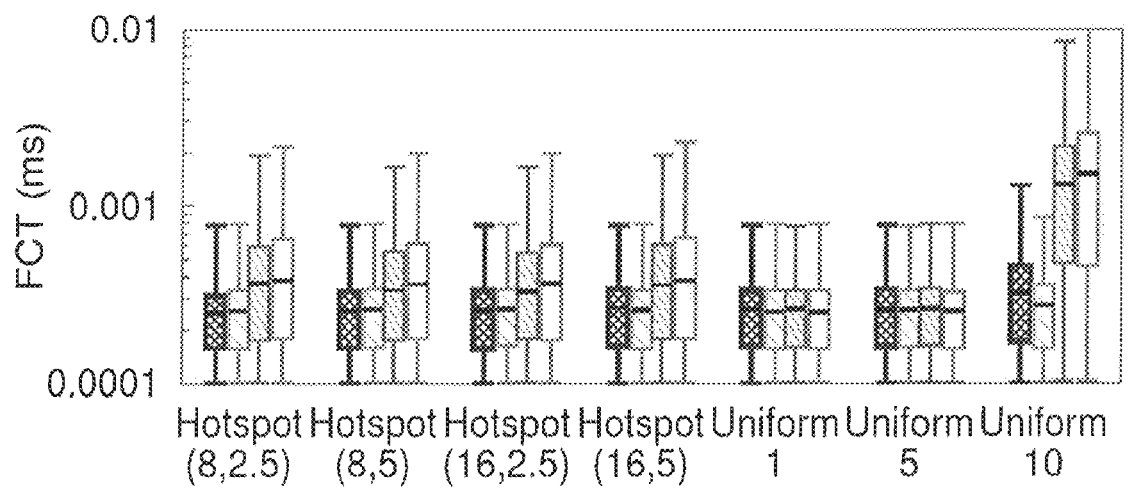
Figure 7C:
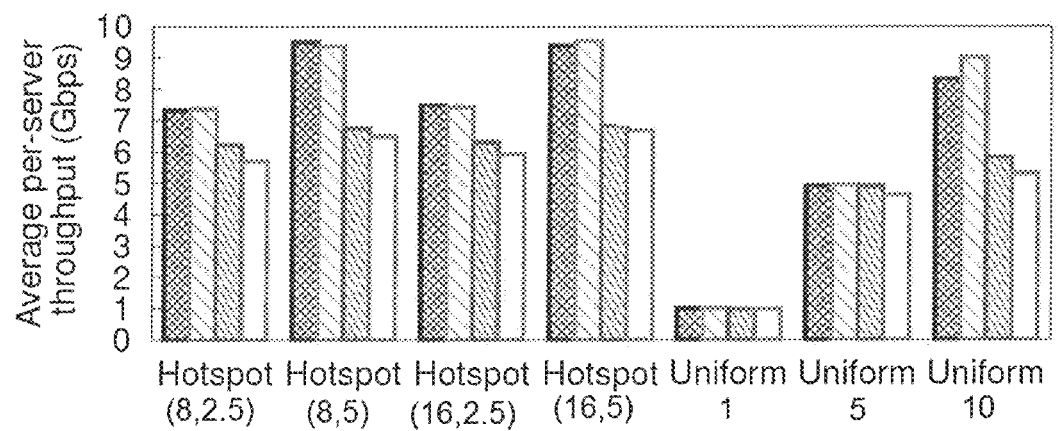

As a starting point, htsim is used for a detailed packet-level simulation. According to embodiments, htsim was extended to support short flows, arbitrary traffic matrices, and route reconfigurations. Due to scaling limitations of htsim, even a high-end server (2.6 GHz, 64 GB RAM) could only scale to a 64-rack DC at 10 Gbps workloads. FIGS. 7(a)-(c) show flow completion times (FCT) and average throughput per-server using the htsim simulator on a 64-node topology for different workloads. FIGS. 7(a) and 7(b) show a box-and-whiskers plot showing maximum, minimum, median, 25% iles, and 75% iles of the FCT for long/short flows respectively for a 30 secs run. The result shows that performance of an FSO network according to an embodiment is close to the full-bisection bandwidth network in both cases. c-Through and 3 DB do not perform as well because their augmented network is not sufficient to compensate for the oversubscription. Thus, their tail performance for long flows suffers. In addition, the FCT for short flows is similar across a network according to an embodiment and FatTree.

FIG. 7(c) shows the effective average per-server throughput in the 64-rack setup for different workloads. For the Uniform the average is overall servers whereas for Hotspot the average is over the hotspot servers. In short, performance of a network according to an embodiment is close to the full-bisection bandwidth network and roughly 1.5× better than the augmented architectures.

Figure 8A:
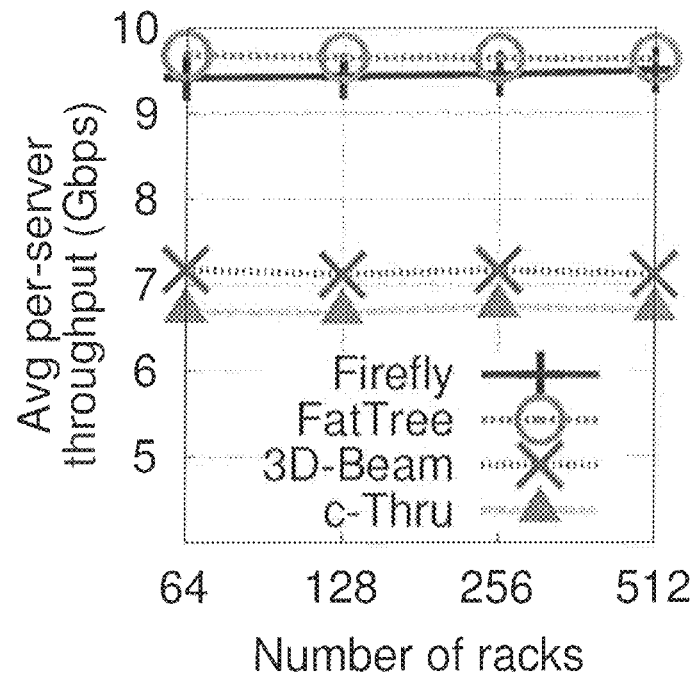
FIG. 8 shows scalability evaluation using a flow-level simulator according to an embodiment of the disclosure.
Figure 8B:
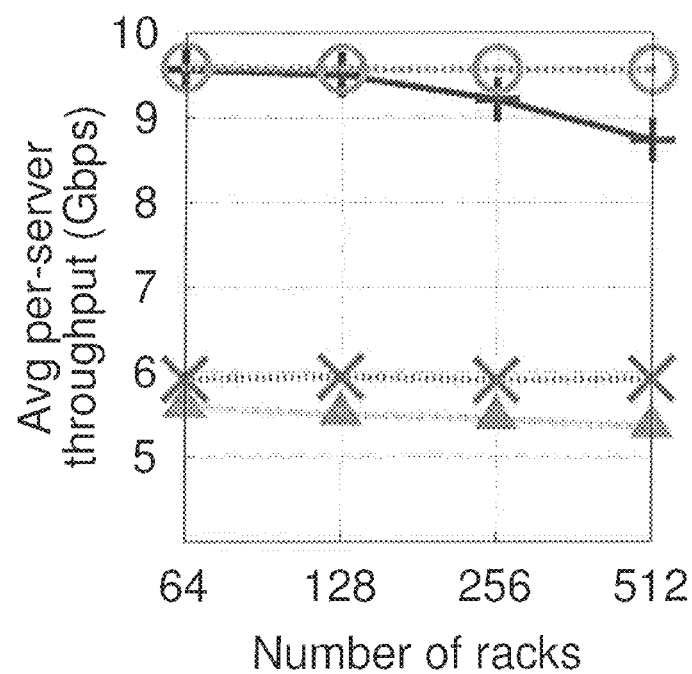

To scale to larger DCs, a custom flow-level simulator is used after confirming that these simulations roughly match the packet-level simulations. In general, the flow-level simulations overestimates the throughput 5-7% for all architectures since it does not model packet-level effects. Since a goal is to compare the relative performance of these architectures, these simulations are still instructive. FIG. 8, which shows scalability evaluation using a flow-level simulator, shows that the earlier performance results continue to hold for the most saturating workloads even at larger scales. The only drop is at 512 racks for Uniform10; here the number of SMs/FSO is slightly sub-optimal as the number of racks grows.

According to embodiments, the packet latency (number of hops) statistics were measured and the average latency were 3.91 (a network according to an embodiment), 4.81 (FatTree), and 3.9 (3 dB, c-Through), while the maximum was 5 for a network according to an embodiment and 6 for the rest.

Performance During Reconfigurations

Because packet- or flow-level simulations do not provide a detailed replay of the events at a controller and network according to embodiments, Mininet was used for this evaluation Due to scaling limitations, the DC size was scaled to 32 racks and the link rates to 10 Mbps, and correspondingly scaled the workload down. Since a goal is to understand the relative impact of reconfigurations with respect to steady state behavior, this setup may be representative. In particular, note that the relative "penalty" of the reconfiguration latency remains the same since the workload is scaled down with the link rates.

Figure 9:
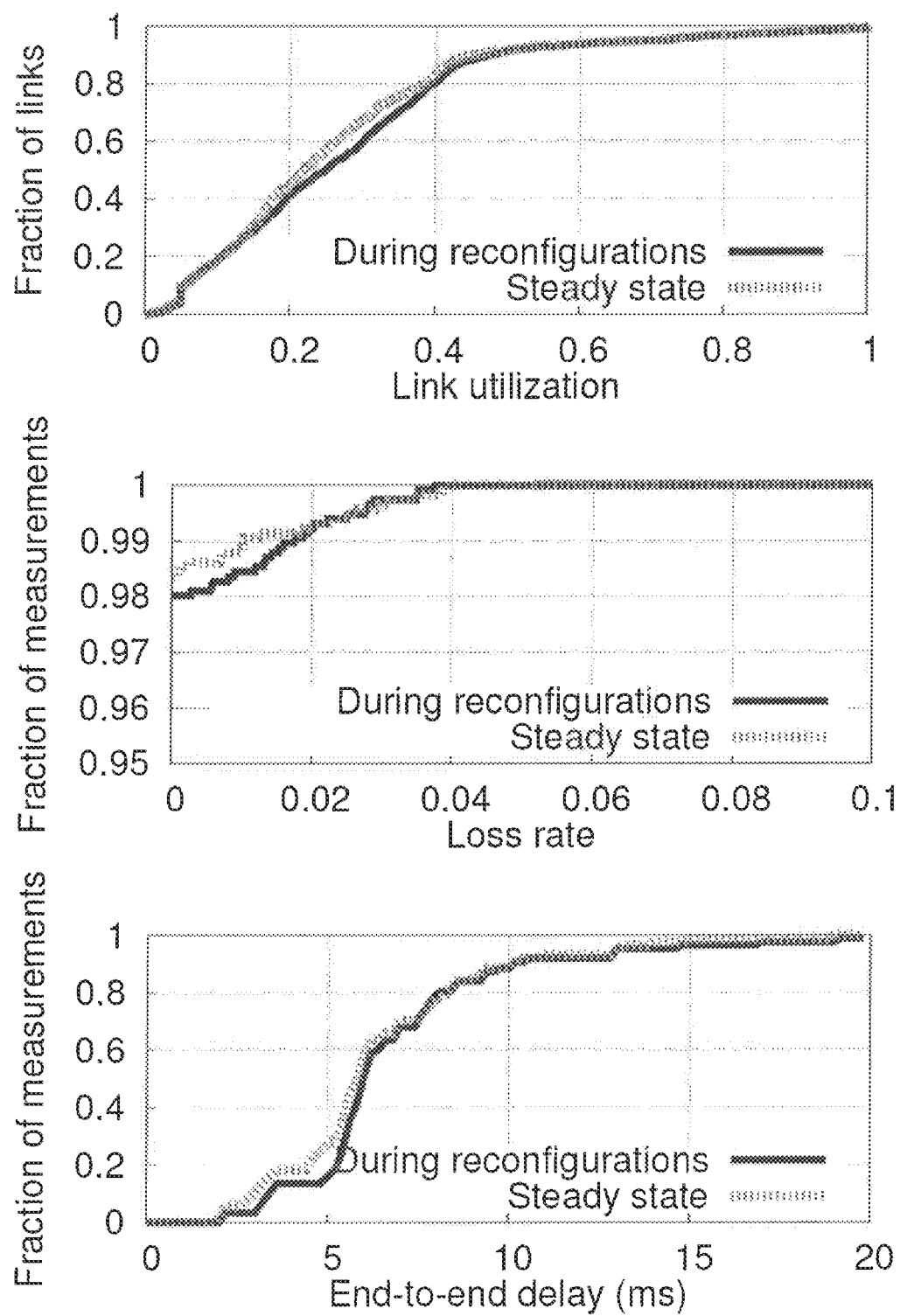
FIG. 9 compares network performance during reconfigurations and in steady state according to an embodiment of the disclosure.

For the following result, a HotSpot workload is considered, with seven distinct reconfigurations as elephant flows arrive. Virtual switches are polled to obtain link utilization and loss rates and a per-rack-pair ping script is used to measure inter-rack latency. These measurements are divided into two logical bins: (a) During reconfigurations and (b) Steady state (i.e., no active reconfiguration). FIG. 9, which compares network performance during reconfigurations and in steady state, shows the distribution link utilization, loss rate, and inter-rack latency for each bin. While there is a small increase in the tail values, the overall distributions are very close. This suggests that the impact on the network during reconfigurations is quite small and that mechanisms according to embodiments work as expected.

Optimality of Preconfiguration Algorithms

As before, 48 FSOs per rack were used with 10 SMs per FSO for SM-PCFT, and GMs with an coverage-angle of 40° are assumed for GM-PCFT. Approximately 15n, n is the number of racks, random instances were generated and the best were picked. The estimated DBW was normalized with respect to an upper bound of nm/2. Table 1, shown in FIG. 10, which illustrates the efficiency of PCFT algorithms according to embodiments, shows that the SM-PCFT and GM-PCFT solutions achieve ≤91% and ≤84% of the upper bound across different DC sizes. The lower performance of a GM-PCFT according to an embodiment is likely because of less randomness due to a block-level construction. This does not however impact the performance of the runtime topology in practice for the workloads being considered.

In addition, an incremental expansion scenario was evaluated which retains most existing PCFT as new racks are added, similar to Jellyfish. It was found that incrementally constructed PCFTs perform nearly identical with respect to a PCFT computed from scratch. This may stem from the incremental expandability of random graphs.

Optimality and Scalability of Reconfiguration

Table 2, shown in FIG. 11, which illustrates scalability and optimality of a network reconfiguration algorithm according to an embodiment of the disclosure, shows the computation time and optimality gap of a two-step heuristic described above. Two points of comparison are considered: (a) A full-linear program (LP) relaxation of FIG. 5, which also yields an upper-bound on the optimal, and (b) a Greedy-LP which uses greedy topology selection but solves the flow routing LP using Gurobi. An approach according to an embodiment can be several orders of magnitude faster—Full-LP and Greedy-LP simply do not scale for ≥32 racks. This is crucial as a controller according to an embodiment may need to periodically reoptimize a network according to an embodiment every few seconds. Moreover, the upper bound on the optimality gap is ≤2.8%. Finally, triggered reconfigurations incur only 5-10 msec. Most of the time is actually spent in route computation, which can be run in parallel to allow a high rate of concurrent reconfigurations.

Sensitivity Analysis

Given that embodiments of the disclosure provide a new technology, the sensitivity is evaluated with respect to key parameters: number of FSOs, number of SMs, and the reconfiguration latency. Table 3, shown in FIG. 12, which illustrates average throughput per-server on Uniform10 for varying network parameters, shows the average per server throughput on a range of instantiations of networks according to embodiments. As before, a configuration of 512 racks was used, with 48 servers each. As expected, the performance decreases almost linearly with decrease in the number of FSOs per rack. The performance degradation in GM-based networks is comparatively better. Note that the networks with fewer FSOs also have almost-proportionally lower cost. However, increasing the number of SMs per FSO does counter the degradation to some extent, due to increase in flexibility. If FSO size is the limiting concern, one way to get higher performance is to simply decrease the number of servers per rack; i.e., increase number of racks for a fixed total number of servers. Finally, with respect to reconfiguration latency, varying the latency from 10 msec to 50 msec has minimal (<5%) impact on the performance a network according to an embodiment. This is a positive result in that good performance can be achieved even with unoptimized steering delays and network update times.

Cost Comparison

As an instructive case, consider a DC with 512 racks and 48 servers/rack to compute the equipment, power, and cabling costs of different architectures. Table 4, shown in FIG. 13, illustrates the cost, in millions of USD, of equipment, power, and cabling assuming 512 racks with 48 servers/rack. These estimates are rounded to the nearest million. Both copper- and fiber-based realizations are considered for the wired architectures.

The "bulk" price of 10 GbE network switches can be estimated to be $100 per port and that of 10 GbE SFPs at $50 each; these estimates are roughly 50% of their respective retail costs. Thus, fiber-based architectures incur a cost of $150 per-port, while copper-based architecture incur a cost of only $100 per-port. A free-space optical inter-rack network according to an embodiment uses a 96-port (10 G) ToR switch on each rack with 48 FSOs, the full-bisection FatTree needs 1536 96-port (10 G) switches, while the 1:2 oversubscribed cores of c-Through/3 DB use roughly half the ports of FatTree. A free-space optical inter-rack network according to an embodiment has an additional cost for FSO devices (on half the ports), which we estimate to be $200 per device including SMs or a GM. For 3 DB, assume that there are 8 60 GHz radios per rack with each assembly costing $100. For c-Through, assume that the 512-port optical switch to be $0.5 M. Ceiling mirrors in FSO and 3 DB are assumed have negligible cost. For cabling, use an average cost of $1 and $3 per meter for copper and optical-fiber respectively, and use an average per-link length of 30 m. The 5-yr energy cost can be estimated using a rate of 6.5 cents/KWHr, and per-port power consumption of 3 W (fiber) and 6 W (copper). The negligible energy cost of SMs, 60 GHz radios, and the optical switches can be ignored.

Overall, the total cost of a free-space optical inter-rack network according to an embodiment is 40-60% lower than FatTree and is comparable (or better) than the augmented architectures. Note that the augmented architectures have worse performance compared to a free-space optical inter-rack network according to an embodiment, and copper wires have length limitations.

Operation Concerns

According to embodiments, external tools are needed for pre-aligning SMs/GMs. Fortunately, as this will be done infrequently, this mechanism does not need the stringent cost/size requirements and existing mechanical assemblies can be repurposed. While a design according to an embodiment tolerates minor misalignments, long term operation may need occasional alignment corrections. Here, feedback from the digital optical monitoring support available on optical SFPs can be used; GMs can directly use such feedback, but SMs may need additional micro-positioning mechanisms, e.g., piezoelectrics.

Some recurrent concerns include dust settling on optics, light scattering effects, reliability of mechanical parts, and human factors, such as the need for protective eyewear for operators. However, although dust/scattering may reduce the signal, a design according to an embodiment has sufficiently high link margins (15 dB), and the devices can be easily engineered to minimize dust, through non-interfering lids or blowing filtered air periodically. In addition, future MEMS-based scanning mirrors are expected to be very robust. Finally, the lasers use in an embodiment are infra-red and very low power which are not harmful to the human eye.

Line of Sight for FSO Links

The use of a full-ceiling mirror imposes operational and infrastructural challenges and expenses. Further embodiments of the disclosure can provide alternative schemes to provide line-of-sight for FSO links: (1) strategically placed multiple but small overhead mirrors, and (2) "towers" on top of racks, on which FSOs can be placed at regular heights.

Line-of-Sight Via Overhead Mirrors

Further embodiments of the disclosure can provide line-of-sight (LOS) between FSO devices using a sufficient number of relatively small mirrors in lieu of a full ceiling mirror.

DEFINITION 1. Reflection Point: Consider a network according to an embodiment of the disclosure with a ceiling, i.e., the height at which horizontal overhead mirrors may be installed for beam redirection. A reflection point for an assigned candidate link connecting two FSOs a and b is the point p on the ceiling such that (1) a, b, and p are on the same vertical plane, and (2) p is equidistant from a and b. Essentially, p is the point on the ceiling such that a beam from a when directed towards p on a horizontal mirror will reach b.

An embodiment can provide LOS via placement of a number of small overhead mirrors based on the following insights.

1. First, observe that, for any dynamic graph, LOS can be provided for each link individually and independently by placing a small mirror at its reflection point. These small mirrors can be very small, e.g., 1 cm×1 cm to accommodate anticipated misalignment tolerance.

Figure 14:
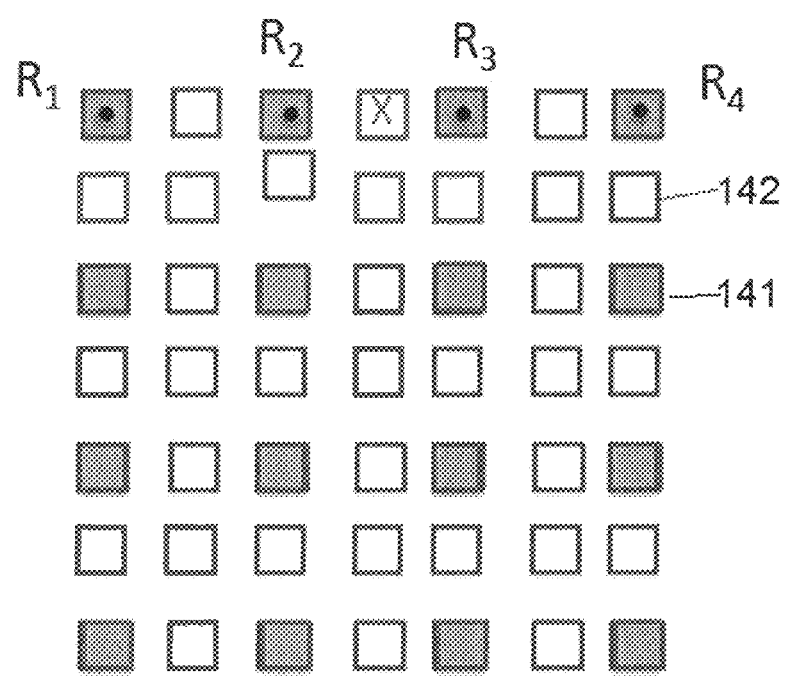
FIG. 14 is a top view of a DC according to an embodiment of the disclosure.

2. The above approach however is likely to result in too many mirrors, since the number of candidate links may be of the order $O(n^2)$ where n is the number of racks. However, the "regularity" of the rack locations and the FSO positions on top of the racks can result in many of these small mirrors being located close-by. Thus, according to an embodiment, multiple small mirrors can be combined into a slightly-larger mirror, leading to a more manageable solution that includes a smaller number of slightly-larger mirrors. For example, FIG. 14 is a top view of a DC according to an embodiment, with 16 racks 141 (solid squares), and 49 overhead mirrors 142 placed above all (solid and hollow) squares. The mirror marked "X" provides LOS between FSOs on racks $R_1$ and $R_4$ and $R_2$ and $R_3$. FIG. 14 shows that the placement of less than 4n mirrors, each of size equal to the top of the rack, are sufficient to provide LOS between FSOs placed on a rectangular grid of n racks.

Figure 15:
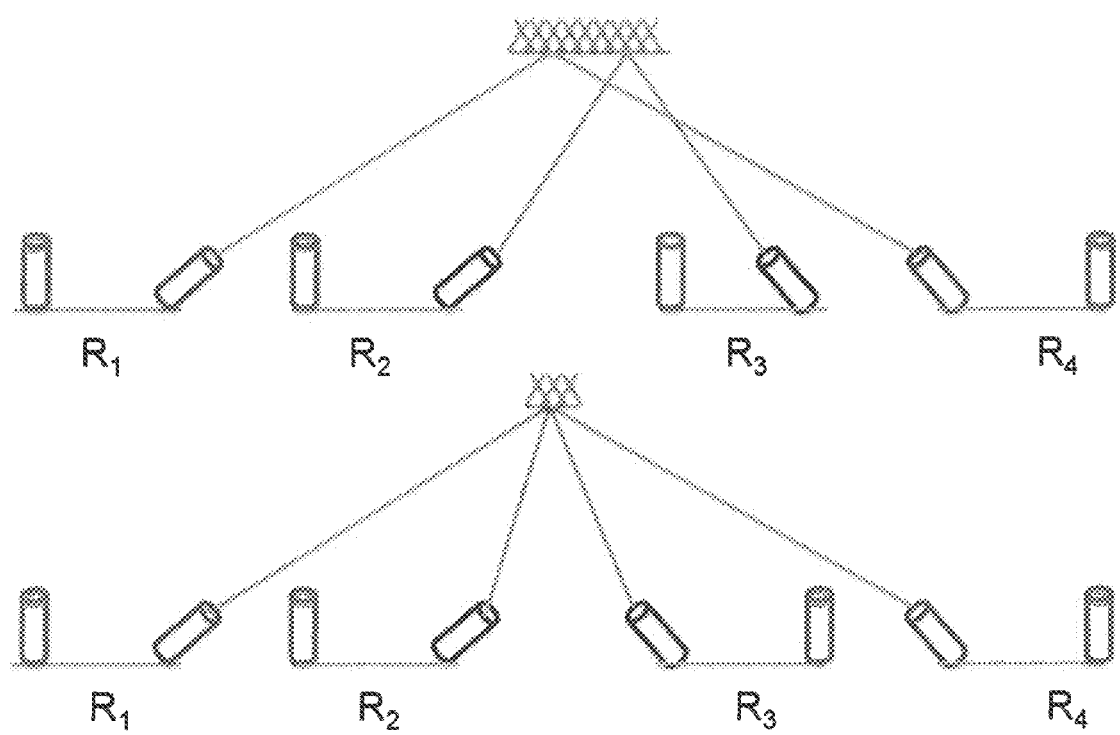
FIG. 15 illustrates how careful assignment of (unassigned) candidate links to FSOs can reduce the number and size of the individual mirrors, according to an embodiment of the disclosure.

3. The number and size of the individual mirrors can be further reduced by a careful assignment of (unassigned) candidate links to FSOs, as illustrated in FIG. 15. FIG. 15 depicts a dynamic graph $\{(R_1, R_4), (R_2, R_3)\}$. The top view depicts naïve assignments in which separate mirrors connect $(R_1, R_4)$ and $(R_2, R_3)$, while the bottom view depicts an optimized assignment in which the same mirrors connect $(R_1, R_4)$ and $(R_1, R_3)$.

The following subsections describe techniques according to embodiments that can provide LOS for FSO links using a sufficient number of small overhead mirrors, for both SM-based embodiments and GM-based embodiments.

SM-Based DC Architecture

According to an embodiment, an SM mirror design task is to create a dynamic graph with near-optimal performance over the given network configuration, while minimizing the usage of overhead mirrors. For simplicity, network performance is represented by the number of candidate links created.

Formally, given parameters of network according to an embodiment, such as layout of the racks, number of FSOs and their placement on each rack, number of SMs per FSO, an SM task can: (1) create a dynamic graph over FSOs, and (2) determine the positions of overhead mirrors to place on the ceiling to provide LOS for the candidate links in the dynamic graph. An optimization objective according to an embodiment is: (1) to maximize the number of rack-pairs that have at least one candidate link between them in the dynamic graph, which is slightly different than simply maximizing the total number of candidate links, since some rack-pairs may have multiple candidate links between them, and (2) to minimize the total area of rectangular overhead mirrors, under the constraint that the total number of mirrors used is below a given constant r.

Figure 26:
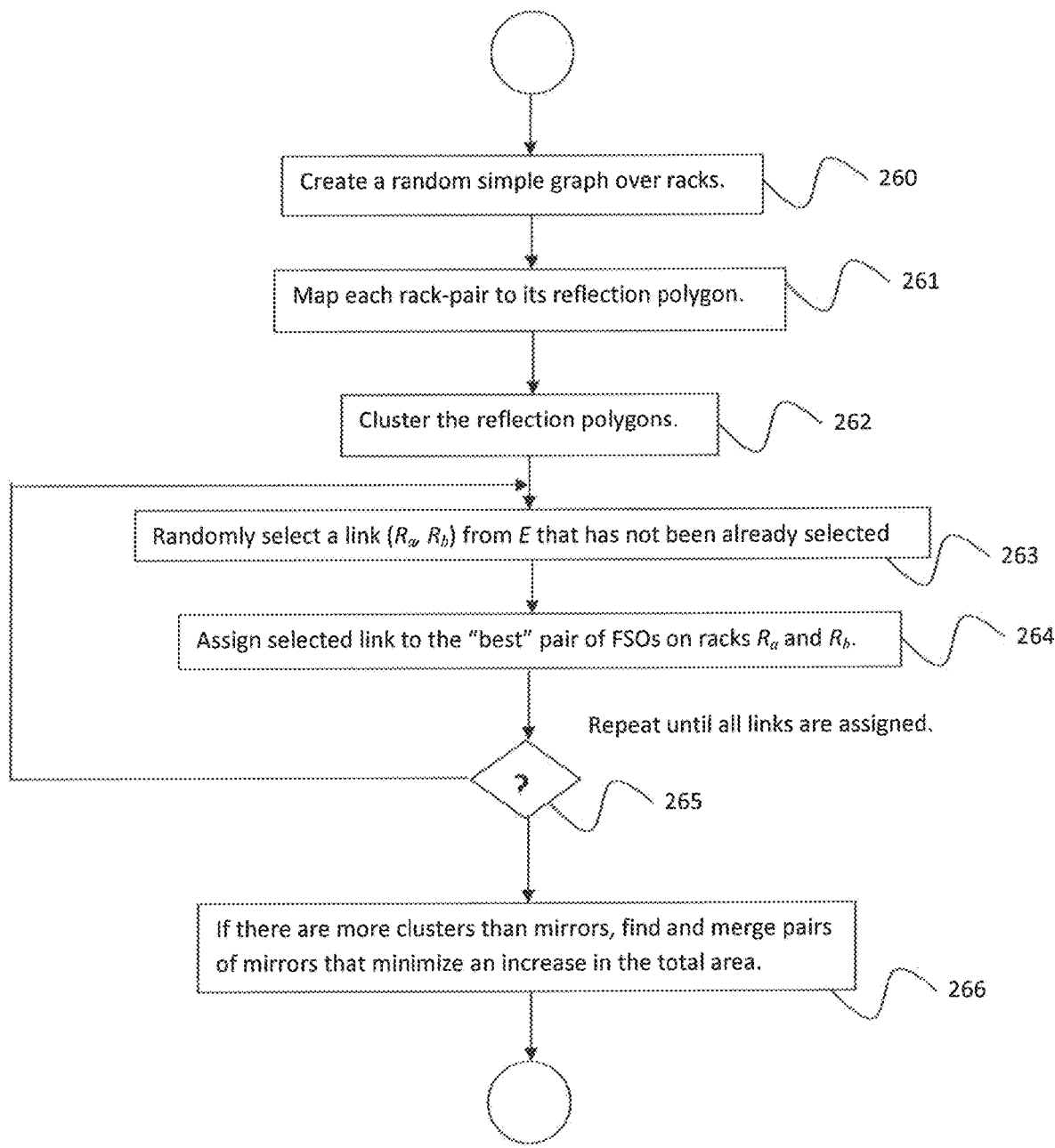
FIG. 26 is a flowchart of an SM task algorithm according to an embodiment of the disclosure.

FIG. 26 is a flowchart of an SM algorithm according to an embodiment of the disclosure. Referring now to the figures, an SM algorithm according to an embodiment starts at step 260 by creating a random simple graph G over racks such that each rack has mk links, where m is the number of FSOs per rack and k is the number of SMs per FSO, assuming mk is less than the total number of racks. Note that G has the maximum number of links possible in any dynamic graph. Then as described in further detail below, an algorithm according to an embodiment then assigns these (unassigned) candidate links of G to FSOs, thus creating a dynamic graph over the FSOs. Since the above method creates the maximum number of candidate links possible in a dynamic graph, an algorithm according to an embodiment can then minimize the total area of the mirrors placed.

An algorithm according to an embodiment assigns links to FSOs so that the resulting reflection points of the assigned candidate links can be clustered, based on location, into a small number r of clusters. First, the unassigned candidate links are clustered appropriately, and then the candidate links are assigned to FSOs in a greedy manner while minimizing the total area of the mirrors. According to an embodiment, one overhead mirror of appropriate size is used to cover the reflection points in each cluster. Before describing an algorithm more formally, a term is defined.

Figure 16:
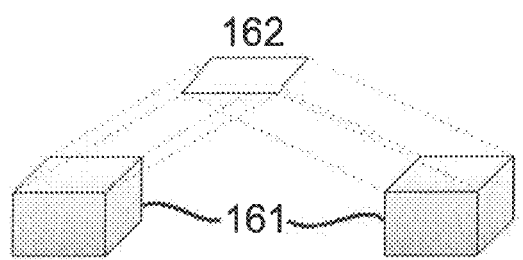
FIG. 16 depicts a pair of racks and its associated reflection polygon, according to an embodiment of the disclosure.

DEFINITION 2. Reflection Polygon: For any pair of racks $R_a$ and $R_b$, a reflection polygon is defined as the convex hull of the reflection points of all possible (assigned) candidate links connecting an FSO on $R_a$ to an FSO on $R_b$. FIG. 16 depicts a pair of racks 161 and its associated reflection polygon 162, according to an embodiment of the disclosure. To construct the reflection polygon, consider the sixteen reflection points corresponding to the candidate links connecting the FSOs on the "corners" of racks $R_a$ and $R_b$, and then find the convex hull of these points.

Since an unassigned candidate link can be characterized by the corresponding pair of racks, the clustering of unassigned links can be looked upon as clustering of rack-pairs. Essentially, an algorithm according to an embodiment can cluster the rack-pairs such that two rack pairs $(R_a, R_b)$ and $(R_c, R_d)$ are in the same cluster iff any assigned candidate links connecting $R_a$ to $R_b$ or connecting $R_c$ to $R_d$ will have closely-located reflection points. This idea is illustrated in FIG. 15, in which rack pairs $(R_1, R_4)$ and $(R_2, R_3)$ should be clustered together.

Referring again to FIG. 26, to cluster the rack-pairs, an algorithm according to an embodiment continues at step 261 by mapping each rack-pair to its reflection polygon, and at step 262 clustering the reflection polygons, which in turn clusters the rack-pairs. The reflection polygons can be a clustered by being "stabbed" with a minimum number of points. Here, a point is said to stab a polygon if it lies inside the polygon. A standard greedy approach can be used to stab the given polygon with a minimum number of points. The set of polygons that are stabbed by the same point are placed in the same cluster; if a polygon is stabbed by multiple points, then it is randomly placed in one of the corresponding clusters.

According to an embodiment, once the rack-pairs, and thus, the unassigned candidate links, have been clustered as above, a greedy approach can be used to assign the candidate links to FSOs. Let the given set of unassigned links be E. At step 263, in each iteration, randomly select a link $(R_a, R_b)$ from E that has not been already selected, and assign it at step 264 to the "best" pair of FSOs on racks $R_a$ and $R_b$. The best pair of FSOs is the one that results in the minimum increase of the area of the overhead mirror currently being used to cover the reflection points of already-assigned links in the cluster of $(R_a, R_b)$. If $(R_a, R_b)$ is the first link being considered from its cluster, then the assignment to FSOs is randomly performed. While performing the above, embodiments ensure that no FSO gets more than the maximum number of links allowed per FSO. Steps 263 and 264 are repeated from step 265 until all links in set E are assigned. An algorithm according to an embodiment allows each link to be eventually assigned, thus, create a dynamic graph with maximum number of links possible.

After the above assignment, there may be more clusters than the r mirrors. In such a case, according to an embodiment, at step 266, to satisfy the constraint of r mirrors, iteratively find and merge a pair of mirrors that minimizes an increase in the total area when merged together.

GM-Based DC Architectures

According to an embodiment, a GM mirror design task is to create a dynamic graph with near-optimal performance over the given network configuration, while minimizing the usage of overhead mirrors, the same as for the SM task except that the candidate links have another constraint, viz., there must be an orientation of the GM at each FSO a so that all the assigned links at a are covered by the GM. The input is same as that of an SM task according to an embodiment, except that each FSO is equipped with a GM.

According to an embodiment, a challenge regarding a GM task is that for a candidate link (a, b) connecting a to b to be valid, the GM of a should "cover" b, i.e., the corresponding reflection point, and vice versa. Thus, the GMs can be oriented in pairs or sets, as in the case of preconfiguring the GM-PCFT. In light of the above, an algorithm according to an embodiment for a GM task includes the following high-level steps. These steps will be described in greater detail with respect to FIG. 27, below.

(1) As with an SM task according to an embodiment, a random simple graph over racks is created. Here, since there is no limit on the number of links per FSO or rack, consider a complete (simple) graph G over the racks, and assign as many links of G as possible. Note that, according to an embodiment, not all links of G may be assigned. As in an initial step of an SM task according to an embodiment, a GM task starts with clustering the rack-pairs, or unassigned candidate links.

(2) Next, orient the GMs to ensure that: (1) there are an adequate number of FSO pairs that have their GM's covering each other, (2) the candidate links in the same cluster, as determined in the first step, have closely located reflection points.

(3) Finally, cover the reflection points of the assigned candidate links using a small number of overhead mirrors.

Figure 27:
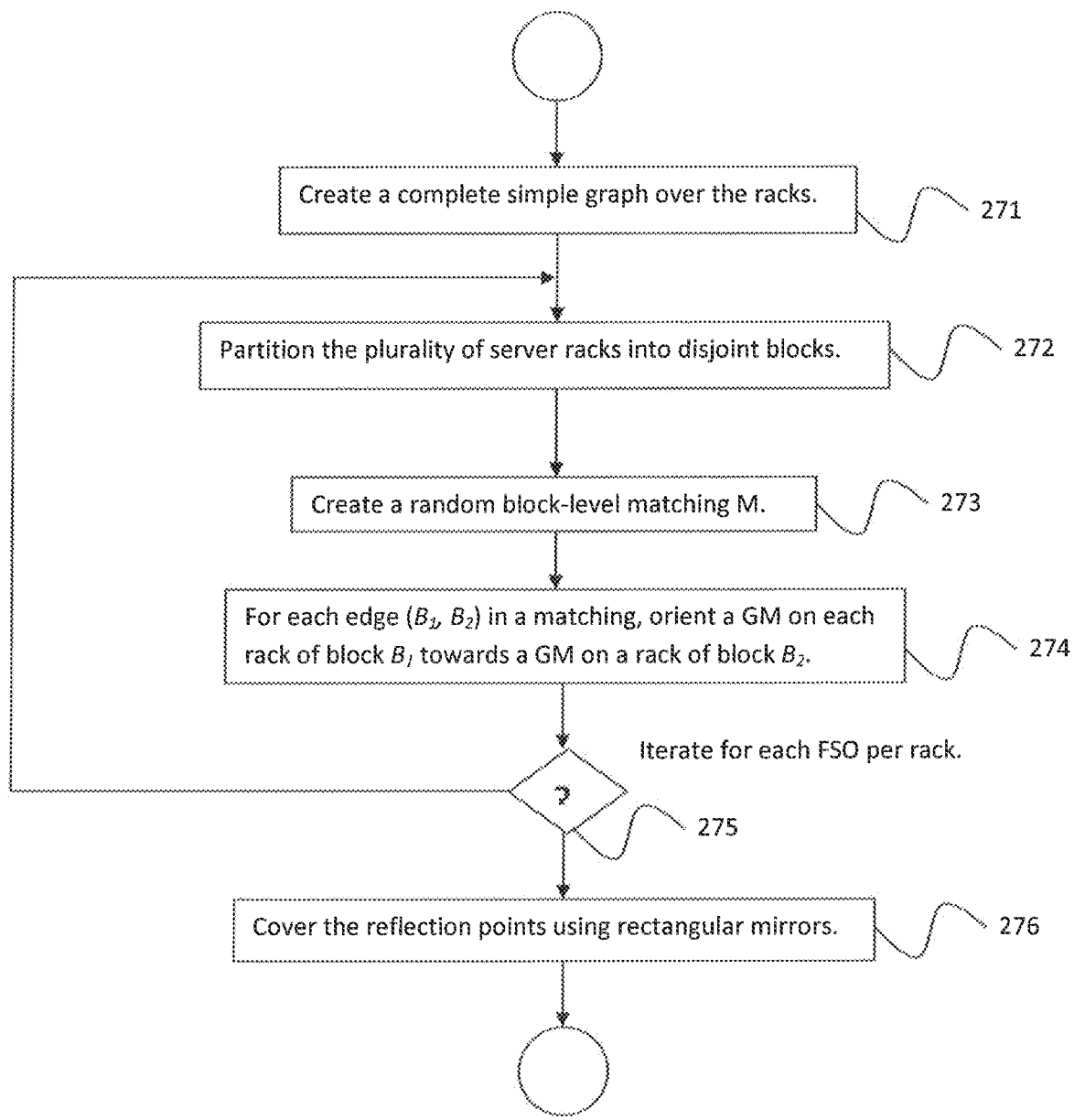
FIG. 27 is a flowchart of a GM task algorithm according to an embodiment of the disclosure.

FIG. 27 is a flowchart of an algorithm according to an embodiment for a GM task. An algorithm begins at step 271 by creating a random simple graph over racks. Since this first step is essentially the same as for an SM task according to an embodiment, the second and third steps will be described in detail.

According to an embodiment, to ensure there are an adequate number of candidate links, the GMs can be oriented sets. According to an embodiment, a block-based heuristic such as that as used for GM-PCFT design can be used, with a slight variation. As used above for GM-PCFT design, the GM was randomly picked from each rack for orientation. However, according to an embodiment, in a present case, a not-already-selected GM can be selected that minimizes the sum of distances between the reflection points of the candidate links in the same cluster. Thus, a method continues at step 272 by partitioning the plurality of server racks into disjoint blocks, wherein each block of server racks is co-located and sufficiently small to be covered by an appropriately oriented GM on any top-mounted switch in the data center, and at step 273 by creating a random block-level matching M, and, at step 274, for each edge ($B_1$, $B_2$) in a matching, orienting a GM on each rack of block $B_1$ towards a GM on a rack of block $B_2$. Each GM selected for orientation minimizes a sum of distances between reflection points of candidate links in a same matching. Steps 272, 273, and 274 are repeated for each FSO per rack from step 275.

Covering the Reflection Points of Assigned Links. At this point, the candidate links are assigned to FSOs, and thus, a next step is to cover the reflection points on the ceiling with a small number of overhead mirrors. This can be looked upon as a set-cover task, where the reflection points are the elements to be covered, and sets are the possible mirrors that can be placed on the ceiling to cover the points. According to an embodiment, the shape of the mirrors is limited to be rectangles, corner points of the rectangles can be reflection points, and mirrors have an appropriate minimum size based on the density of the points to cover. Thus, the number of sets are now polynomial in the number of reflection points. Thus, according to an embodiment, a simple greedy approach can be used at step 276 to cover the reflection points using the rectangular mirrors. According to an embodiment, a number of rectangles can be chosen in the order of p/A, where p is the number of uncovered reflection points covered by the rectangle under consideration and A is the area of the rectangle.

LOS Using Towers on Racks

Figure 17:
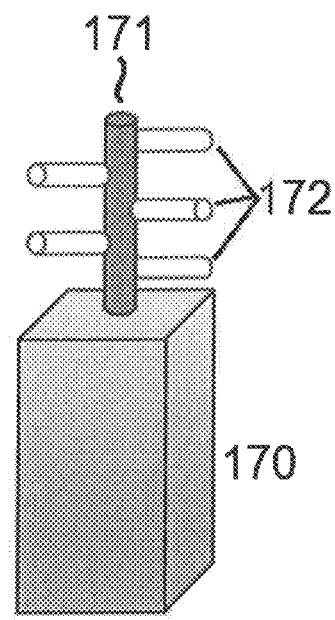
FIG. 17 depicts FSOs on a tower on a rack, according to an embodiment of the disclosure.

According to an embodiment, one strategy to minimize obstructions without using any overhead mirrors is to use a small number (1-3) of "towers" at the top of each rack and place fixed steerable FSO devices at specific heights on these towers. FIG. 17 depicts FSOs 172 on a tower 171 on a rack 170, according to an embodiment of the disclosure. This approach does not eliminate obstructions completely, since the FSOs and the towers may still obstruct with the beams. However, such obstructions can be reduced to a minimum by a careful (1) placement of towers on the rack, (2) placement of FSOs on the towers, and (3) assignment of links to FSOs. Embodiments of the disclosure can provide techniques, described below, that can maximize the number of links with clear line-of-sight (LOS) that can be assigned to the FSOs in the network. In addition, embodiments of the disclosure can provide sturdy towers that can withstand the weight of a few tens of FSOs and preserve the alignment of the links. According to embodiments, 2-3" diameter towers reinforced with carbon fiber rods can easily provide the required stability.

SM-Tower Based DC Architectures

Consider a DC with n racks, each equipped with a certain number of towers, with each pole equipped with a certain number of FSOs, and each FSO is equipped with a certain number of SMs. An SM tower design task according to an embodiment is to (1) place, i.e., determine locations, towers on the top of the rack, (2) place FSOs on each tower, and (3) create a dynamic graph such that each candidate link has a clear/direct line-of-sight, without overhead mirrors for beam redirection. The optimization objective is to maximize the number of rack-pairs that have at least one candidate link between them in the created dynamic graph.

Figure 28:
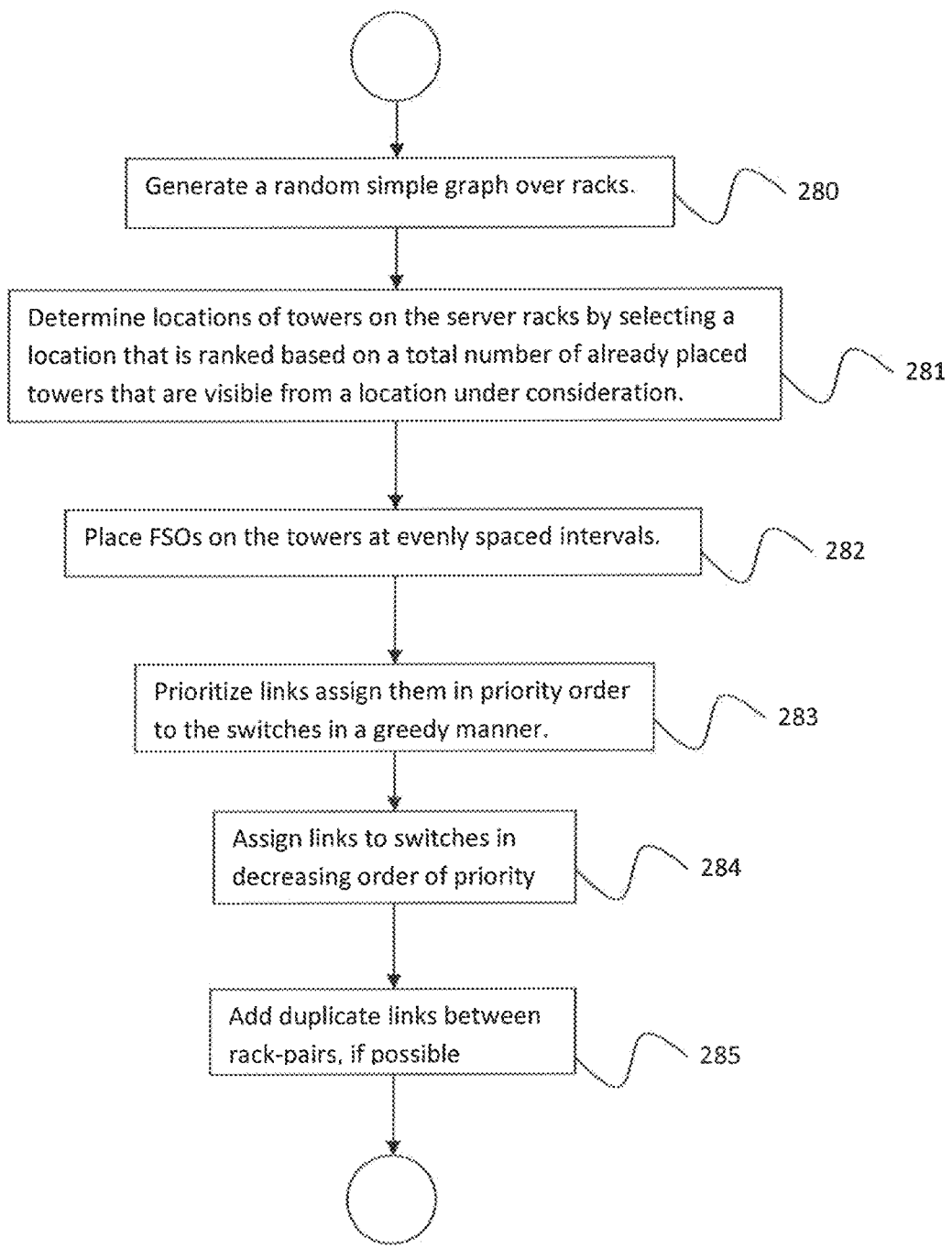
FIG. 28 is a flowchart of an algorithm for an SM tower design task according to an embodiment of the disclosure.

FIG. 28 is a flowchart of an algorithm for an SM tower design task according to an embodiment of the disclosure. An algorithm for an SM tower design task begins at step 280 by generating a random simple graph over racks with mk links. However, since not all links may be assigned due to occlusions, the number of links of G that can be assigned should be maximized.

An algorithm according to an embodiment includes the following steps: (1) First, place the towers on racks in a greedy manner; (2) then, place FSOs on the towers at regular heights; and (3) prioritize links and assign them in the order of their priority to the FSOs in a greedy manner.

According to an embodiment, to determine the locations of the towers on the racks, the best location on top of a rack to place a tower can be iteratively selected. Here, a location is ranked based on a total number of already placed towers that are visible from the location under consideration. In other words, at step 281, locations of towers are determined on the server racks by selecting a location that is ranked based on a total number of already placed towers that are visible from a location under consideration. During this greedy approach, it is ensured that only the given number of towers are placed on any particular rack. Once the towers have been placed, at step 282, FSOs can be placed on the towers at evenly spaced intervals.

According to an embodiment, to, links are assigned to FSOs in a greedy manner. Here, the (unassigned) candidate links are prioritized, and are considered for assignment one by one in order of their priority. The priorities can be assigned as follows. First, observe that a main reason an unassigned link may not be assignable is that the pairs of FSOs that are actually available, between the corresponding rack pairs, do not have a clear line-of-sight. Based on this observation, the links can be prioritized to avoid the above situation of not being assignable. In particular, at step 283, links are prioritized and assigned in priority order to the switches in a greedy manner, wherein a priority for each link (a, b) is computed as a total number of pairs of switches that have a clear line of sight and can be used to assign the link (a, b). Since the weight may change over the course of the algorithm, the weight of links is kept updated.

Now, according to an embodiment, at step 284, links are assigned to switches in decreasing order of priority, and if no such pair of switches with a clear line-of-sight exists, the link is skipped and the algorithm continues to a next link in order of priority. As a post-processing step, "duplicate" links can be added between rack-pairs at step 285, if possible.

GM Tower-Based DC Architectures

A GM tower design task according to an embodiment is to (1) place, i.e., determine locations, towers on the top of the rack, (2) place FSOs on each tower, and (3) create a dynamic graph such that each candidate link has a clear/direct line-of-sight, without overhead mirrors for beam redirection, with an additional constraint, that there must be an orientation of the GM at each FSO a so that all the assigned links at a are covered by the GM. The input to a GM tower design task according to an embodiment is same as that to an SM tower design task according to an embodiment, except that each FSO is equipped with a GM.

Figure 29:
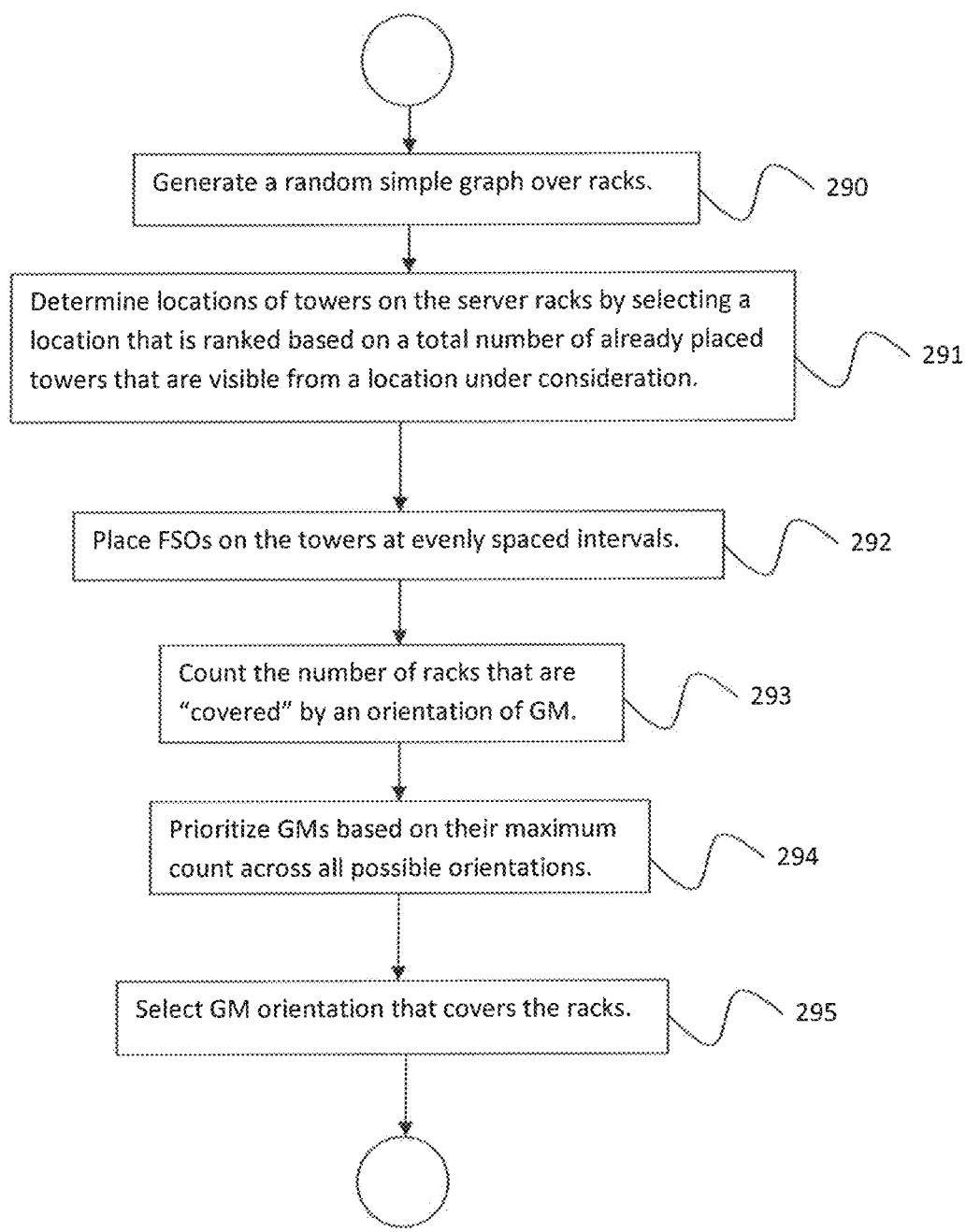
FIG. 29 is a flowchart of a method for a GM tower design task, according to an embodiment of the disclosure.

FIG. 29 is a flowchart of a method for a GM tower design task, according to an embodiment of the disclosure. A GM tower algorithm according to an embodiment begins at step 290 by generating a random simple graph over racks with a maximum possible number of assigned links, and continues by placing the towers on the racks at step 291 and FSOs on the towers at step 292 as in the case of an SM tower task. To orient the GMs, observe that obstructions due to towers and FSOs may determine whether or not a candidate link can be assigned. Thus, according to an embodiment, the GMs are independently oriented, rather than in pairs of sets as in the block-based heuristic according to an embodiment. In particular, according to an embodiment, the GMs are prioritized, and then considered for orientation one at a time in the order of their priority. For a network configuration that has sufficient number of FSOs on each rack, a strategy according to an embodiment should ensure that, for any rack, the set of GMs on that rack collectively "cover" most of the other racks, and that if a rack $R_1$ is covered by a GM $g_2$ on another rack $R_2$, then there is some GM $g_1$ on $R_1$ that covers g on $R_2$, ensuring the desired candidate link between $g_1$ and $g_2$. This hypothesis was confirmed by simulation studies.

According to an embodiment, to assign priorities to a GM, the number of racks are counted at step 293 that are "covered" by an orientation of GM, in which a rack is considered to be covered by a GM if there is an FSO on the rack that has a clear line of sign with the GM. GMs are prioritized at step 294 based on their maximum count across all possible orientations. When orienting a GM at step 295, when its turn comes, the orientation that covers the most number of racks is selected.

LOS Evaluations

Physical Parameters. The performance results of techniques according to embodiments of the disclosure depend on the physical layout of racks. Thus, according to embodiments, two different physical layouts are considered. (1) A random grid of blocks, wherein "blocks" of racks are randomly distributed in a given area with the condition that they are axis-aligned. Here, a block of racks includes 8 racks arranged in a 2 by 4 grid, with a 5 feet gap between the two columns and an inch gap between the rows. (2) A purely random layout, in which the racks are independently and randomly distributed in the given area. After placing each rack, each rack is also rotated by a random angle. The top of each rack can be assumed to be 20 by 40, which is sufficient to accommodate about 50 FSOs. The ceiling can be assumed to be 10 feet above the top of the racks, and the total physical size of the data center can be assumed to be five times the area taken up the racks. Thus, the 512-rack DC is assumed to be in an area of 20,000 square feet.

According to an embodiment, for the overhead mirrors, a buffer of ½ an inch is added to all sides of the mirror, to accommodate minor link misalignments. For the tower-based approaches, towers can be assumed to be 2 inches in diameter with four towers per rack. The total number of FSOs are divided equally among the four towers, and vertical distance between successive FSOs on a tower is 4 inches.

Network Parameters. According to embodiments, by default, simulations are run on a 512-rack network, with each rack including 48 servers. Each rack can be equipped with 48 FSOs. For networks with a smaller number of racks, the number of FSOs per rack is proportionally decreased. In all simulations, an FSO device can be assumed to be equipped with either 10 SMs or a GM with a coverage angle of 40 degrees. All communication links are robust 10 Gbps links. Finally, there is an overall reconfiguration latency of 20 msecs for the SMs as well as GMs steering mechanisms.

Traffic Models. According to embodiments, synthetic traffic models based on DC measurements are used. As a baseline, a Uniform model is considered, where flows between pairs of racks arrive independently with a Poisson arrival-rate $\lambda$/s, with an empirically-derived flow size distribution. According to an embodiment, $\lambda$ can be used as a knob to tune the level of network saturation. Based on prior observations, the Hotspot model is considered, where in addition to the Uniform baseline, a subset of rack pairs have a higher arrival rate $\lambda_2$ and a fixed large flow size of 128 MB. For Uniform loads, the label Uniform X is used where X is average load per server (in Gbps) by choosing suitable $\lambda$. For Hotspot loads, the label Hotspot (Y, X) is used, where Y is the % of racks that are hotspots and X is an additional average load on each hotspot server; all Hotspot workloads use Uniform 5 as the background traffic.

Figure 18A:
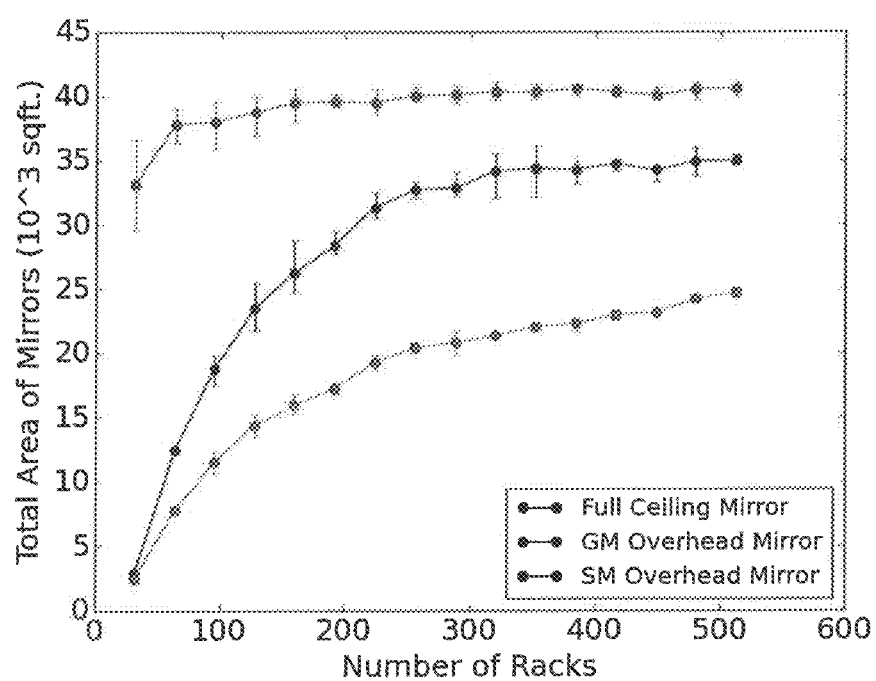
FIGS. 18(a)-(b) shows plots of the total area of overhead mirrors in (a) a random grid and (b) a purely random layouts, for varying network size, according to an embodiment of the disclosure.
Figure 18B:
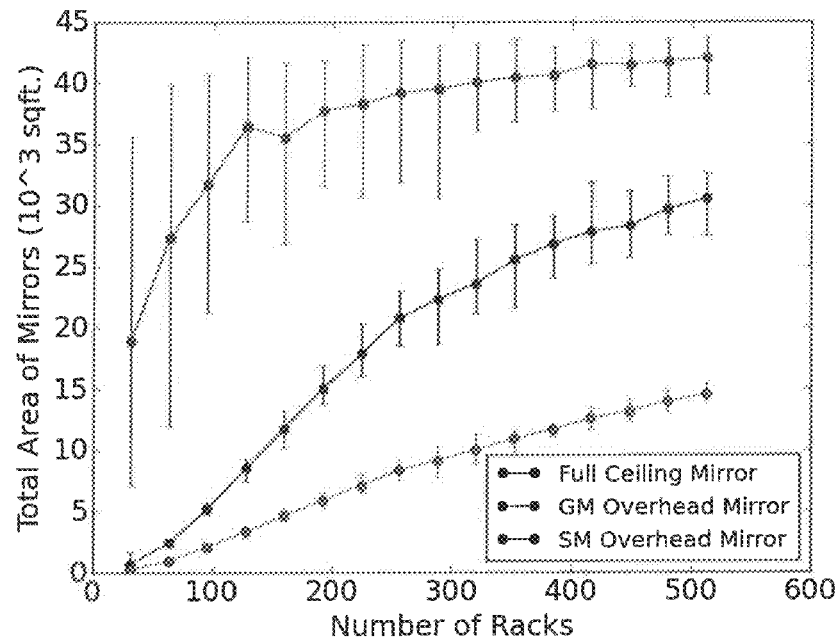

Total Area of Overhead Mirrors: An evaluation according to an embodiment started with comparing the total area of overhead mirrors to a full-ceiling mirror. A random grid of blocks and a purely random arrangement were both considered, and the total mirror area was plotted for varying number of racks. According to embodiment, there can be up to eight times as many mirrors as the number of racks. FIGS. 18(*a*)-(*b*) shows plots of the total area of overhead mirrors in (a) a random grid and (b) a purely random layouts, for varying network size. In both plots, the following can be observed: (1) the total area of mirrors used is less than the full-ceiling mirror, especially for an SM-based architecture; (2) the reduction for GM-based architectures is less than that for SM-based architectures, since the GM-based architectures have an additional constraint on the created links; and (3) the total area of the mirrors used is linear in the number of racks, which suggests the scalability of schemes according to embodiments.

Figure 19A:
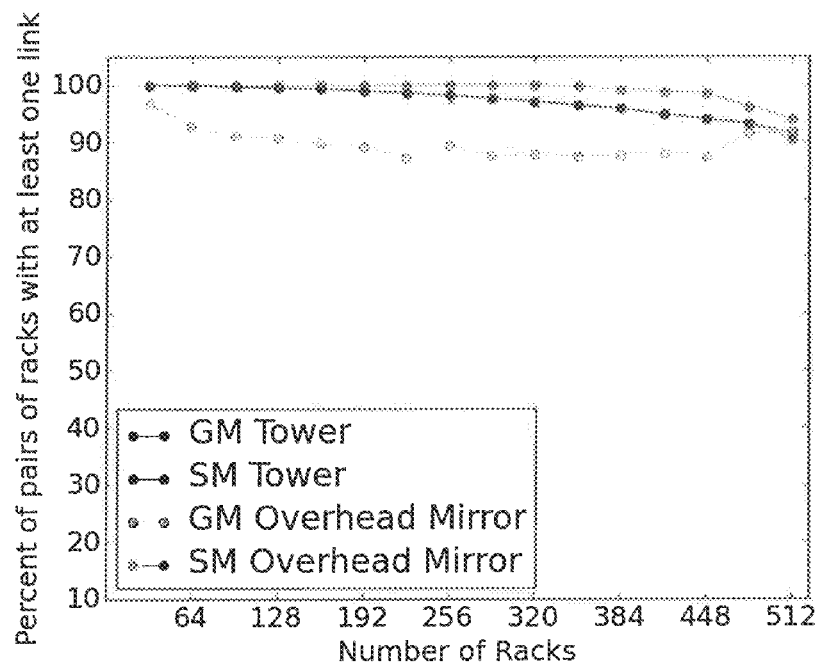
FIGS. 19(a)-(b) show plots of the percentage of rack-pairs with candidate links in (a) random grid, and (b) purely random layouts, for varying network size, according to an embodiment of the disclosure.
Figure 19B:
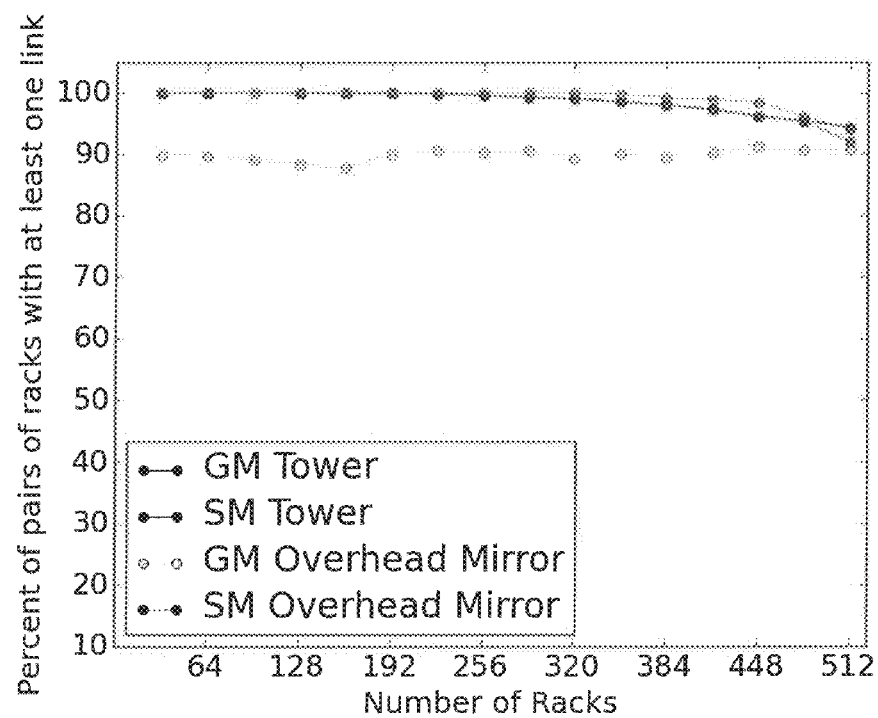

Percentage of Rack-Pairs with a Candidate Link: The percentage of rack-pairs that have a candidate link in the created dynamic graph can, as it is an optimization objective of a method according to an embodiment, can be plotted. FIGS. 19(a)-(b) show plots of the percentage of rack-pairs with candidate links in (a) random grid, and (b) purely random layouts, for varying network size. In both plots, the following can be observed: (1) the percentage is near 100% for an SM mirror scheme, since all links of the "full" graph G can be assigned, and the percentage of rack-pairs is slightly (about 10%) less for a GM-mirror scheme due to the additional link constraint; (2) Surprisingly, for both the tower-based approaches, the percentage of rack pairs is near-optimal, i.e., very close to that of an SM mirror scheme, which suggests the overall robustness of a tower based approach according to an embodiment; and (3) With an increase in the network size, the percentage of rack-pairs with links decreases slightly, which can be expected since there are more occlusions in larger networks.

Figure 20A:
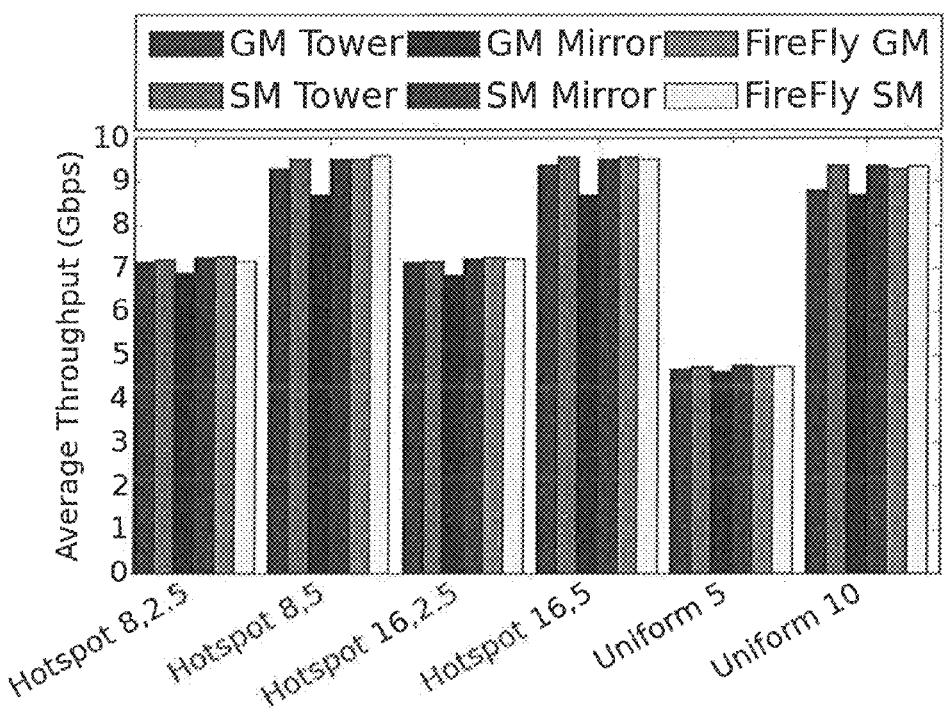
FIGS. 20(a)-(c) show plots of average throughput and flow completion times, in a 512-rack DC for different schemes and traffic patterns according to an embodiment of the disclosure.
Figure 20B:
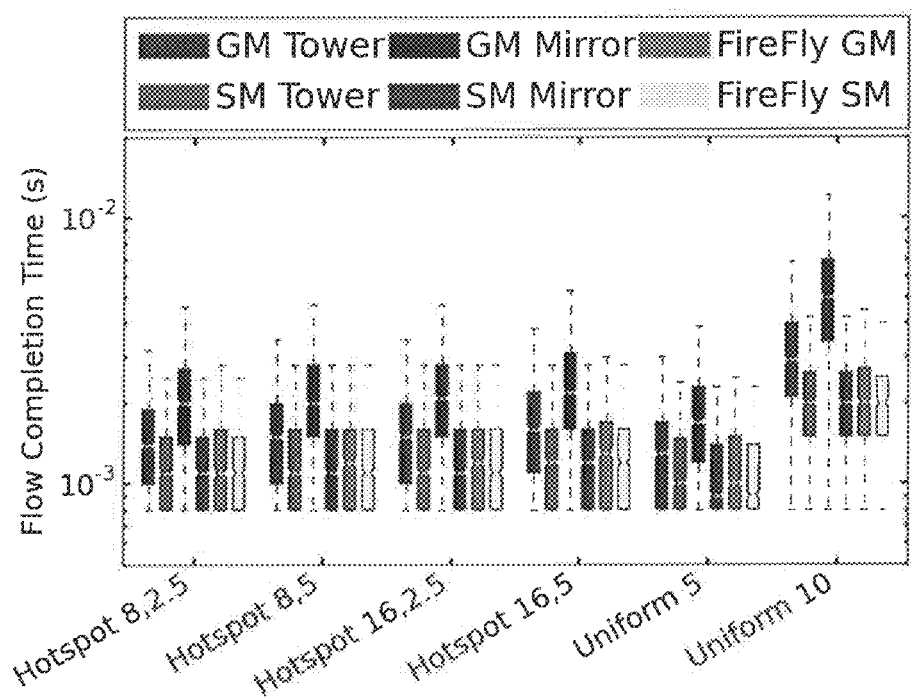
Figure 20C:
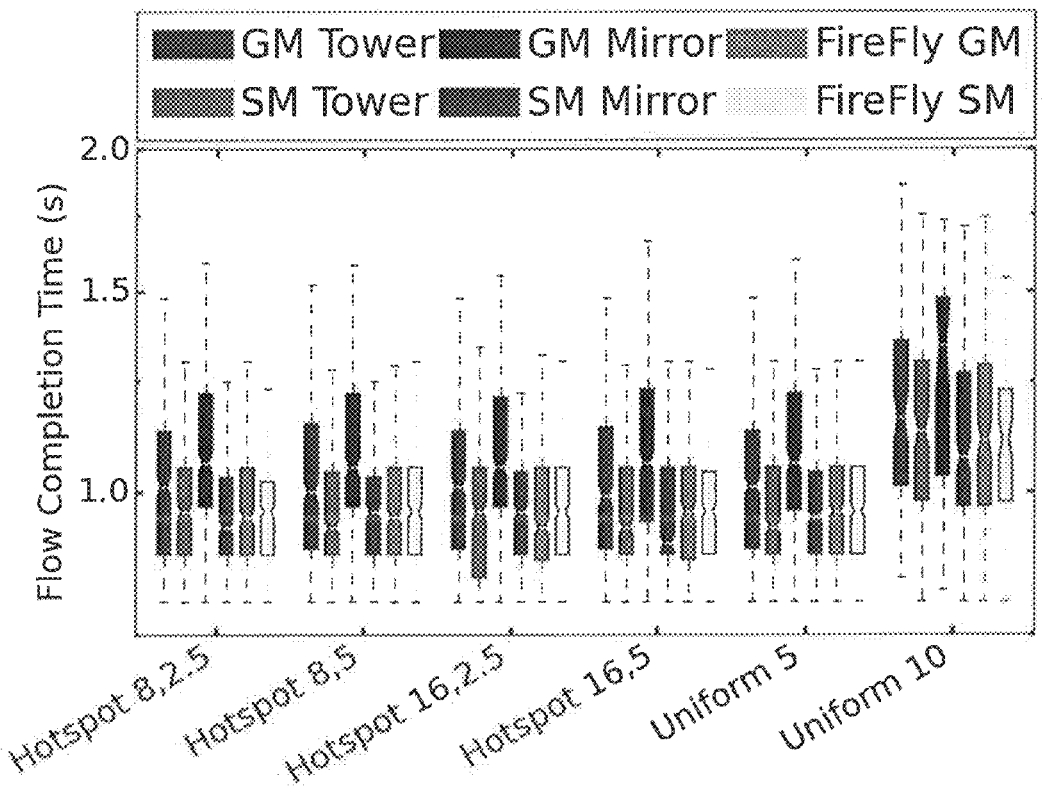

Network Performance Metrics: Finally, the performance of schemes according to embodiments was evaluated in terms of network throughput and flow completion times for various traffic patterns. For this purpose, a custom flow-level network simulator was implemented that supports dynamic networks. For this simulation study, a 512-rack network is used, and the results for the grid-based physical layout were plotted. Results were similar for a purely random layout. FIG. 20(a) plots the average throughput per server; for Uniform the average is over all servers whereas for Hotspot the average is over the hotspot servers. FIGS. 20(b)-(c) show the box-and-whiskers plots, which show maximum, minimum, median, 25% iles, and 75% iles, of the flow completion times (FCT) for short (<100 MB flow size) and long flows respectively. The simulations results are based on a 30 sec run. The average throughput of all schemes is near-optimal for all traffic patterns, except for the case of a GM overhead-mirror scheme which lags by about 5% in half of the traffic patterns. The distribution of FCTs according to embodiments is nearly identical to an embodiment using a full ceiling mirror, except for the case of GM-based architectures which lag by 5-20% for the long flows and more for the short flows.

Controller System Implementations

It is to be understood that a controller of the present disclosure can be implemented in various forms of hardware, software, firmware, special purpose processes, or a combination thereof. In one embodiment, a controller the present disclosure can be implemented in software as an application program tangible embodied on a computer readable program storage device. The application program can be uploaded to, and executed by, a machine comprising any suitable architecture.

Figure 21:
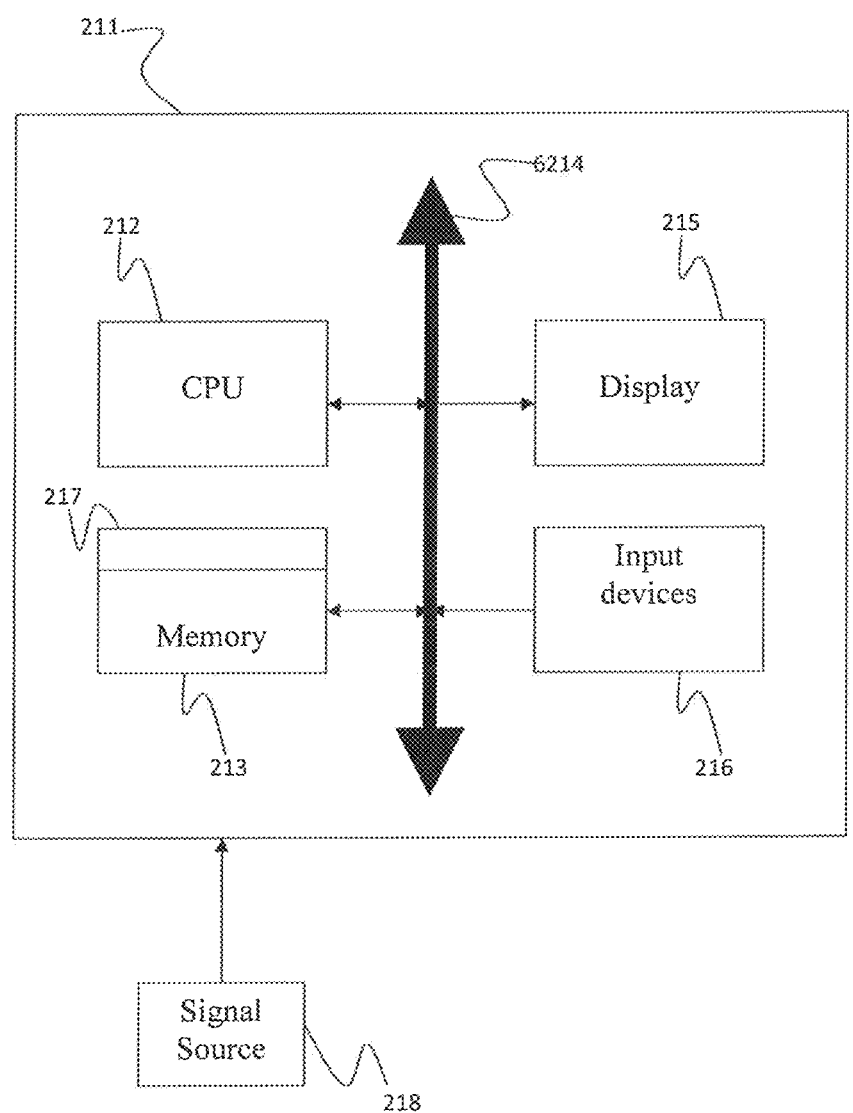
FIG. 21 is a block diagram of a system for managing a flexible free-space optical inter-rack network according to an embodiment of the disclosure.

FIG. 21 is a block diagram of an exemplary computer system for implementing a controller according to an embodiment of the disclosure. Referring now to FIG. 21, a computer system 211 for implementing the present disclosure can comprise, inter ala, a central processing unit (CPU) 212, a memory 213 and an input/output (I/O) interface 214. The computer system 211 is generally coupled through the I/O interface 214 to a display 215 and various input devices 216 such as a mouse and a keyboard. The support circuits can include circuits such as cache, power supplies, clock circuits, and a communication bus. The memory 213 can include random access memory (RAM), read only memory (ROM), disk drive, tape drive, etc., or a combinations thereof. The present disclosure can be implemented as a routine 217 that is stored in memory 213 and executed by the CPU 212 to process the signal from the signal source 218. As such, the computer system 211 is a general purpose computer system that becomes a specific purpose computer system when executing the routine 217 of the present disclosure.

The computer system 211 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present disclosure is programmed. Given the teachings of the present disclosure provided herein, one of ordinary skill in the related art will be able to contemplate these and similar implementations or configurations of the present disclosure.

While the present disclosure has been described in detail with reference to exemplary embodiments, those skilled in the art will appreciate that various modifications and substitutions can be made thereto without departing from the spirit and scope of the disclosure as set forth in the appended claims.

What is claimed is:

1. A reconfigurable free-space optical inter-rack network, comprising:
    a plurality of server racks, each including at least one switch mounted thereon;
    wherein each switch includes a plurality of free-space-optic link connector, each with a free-space optical connection to a free-space-optic link connector on another switch, wherein the free-space-optic link connector comprises a liquid crystal switchable mirror (SM) that is electrically controllable to switch between a reflection mode and a transparent mode;
    a plurality of ceiling mirrors above the plurality of server racks, wherein each of the plurality of ceiling mirrors has an area that is smaller than an area of the top of a server rack, wherein each single ceiling mirror redirects optical connections between one or more pairs of free-space-optic link connectors to provide a clear lines-of-sight between each pair of connected free-space-optic link connectors; and
    a controller that preconfigures a free-space optical network connecting the plurality of server racks by establishing connections between pairs of free-space-optic link connectors, and that reconfigures connections between pairs of free-space-optic link connectors in response to network traffic demands and events.

2. The network of claim 1, wherein the controller preconfigures an alignment of each SM to maximize a number of pairs of racks that have at least one candidate link therebetween in a set of all candidate links, and minimizing a total area of rectangular overhead mirrors.

3. The network of claim 1, wherein the controller preconfigures an alignment of each SM by
creating a random simple graph over racks wherein each rack has mk links, wherein m is a number of switches per rack and k is the number of SMs per switch,
mapping each pair of server racks to its reflection polygon, wherein a reflection polygon is, for any pair of racks $R_a$ and $R_b$, a convex hull of reflection points of all candidate links connecting a switch on $R_a$ to a switch on $R_b$, wherein reflection point for an assigned candidate link connecting two switches a and b is the point p on a ceiling wherein a, b, and p are on the same vertical plane, and p is equidistant from a and b,
clustering the reflection polygons by stabbing the reflection polygons using a minimum number of shared points, wherein a shared point stabs two or more polygons inside those polygons, wherein a set of polygons that are stabbed by a shared point are assigned to a same cluster.

4. The network of claim 3, wherein if a polygon is stabbed by multiple shared points, said polygon is randomly assigned to one of the corresponding clusters.

5. The network of claim 3, further comprising
randomly selecting a link ($R_a$, $R_b$) from a set of unassigned links E that has not been already selected, and
assigning said selected link to a best pair of switches on racks $R_a$ and $R_b$, while ensuring that no switch is assigned more than a maximum number of links allowed per switch, wherein a best pair of switches is one that results in a minimum increase of an area of an overhead mirror currently being used to cover the reflection points of already-assigned links in the cluster of ($R_a$, $R_b$),
wherein said steps of randomly selecting a link and assigning said selected link to a best pair of switches are repeated until all links in set E are assigned.

6. The network of claim 5, wherein if ($R_a$, $R_b$) is the first link being considered from its cluster, then the assignment to a pair of switches on racks $R_a$ and $R_b$ is randomly performed.

7. The network of claim 5, wherein if a number of clusters exceeds the predetermined number of switches, pairs of mirrors are found that minimizes an increase in the total area, and merged.

8. A reconfigurable free-space optical inter-rack network, comprising:
a plurality of server racks, each including at least one switch mounted thereon;
wherein each switch includes a plurality of free-space-optic link connector, each with a free-space optical connection to a free-space-optic link connector on another switch, wherein the free-space-optic link connector comprises a mirror galvanometer (GM) configured to rotate around the axis on a plane of the mirror in response to an electric signal;
a plurality of ceiling mirrors above the plurality of server racks, wherein each single ceiling mirror redirects optical connections between one or more pairs of free-space-optic link connectors to provide a clear lines-of-sight between each pair of connected free-space-optic link connectors; and
a controller that preconfigures a free-space optical network connecting the plurality of server racks by establishing connections between pairs of free-space-optic link connectors,
wherein the controller preconfigures an orientation of each GM by creating a complete simple graph over the plurality of server racks and assigning as many links as possible that connect pairs of top-mounted racks, wherein a number of assigned links is less than or equal to a maximum possible number of links,
partitioning the plurality of server racks into disjoint blocks, wherein each block of server racks is co-located and sufficiently small to be covered by an appropriately oriented GM on any top-mounted switch in the data center,
creating a random block-level matching,
for each edge ($B_1$, $B_2$) in a matching, orienting a GM on each rack of block $B_1$ towards a GM on a rack of block $B_2$, wherein the GM is oriented to minimize a sum of distances between reflection points of candidate links in a same matching, wherein a reflection point for a candidate link connecting two top mounted switches a and b is the point p on a ceiling wherein a, b, and p are on the same vertical plane, and p is equidistant from a and b, and
covering the reflection points on the ceiling with a number of overhead mirrors using a greedy approach wherein the mirrors are shaped as rectangles, a number of rectangles is of order p/A, wherein p is a number of uncovered reflection points covered by a rectangle under consideration and A is an area of the rectangle, wherein mirrors have an appropriate minimum size based on the density of the points to cover.

9. The reconfigurable free-space optical inter-rack network of claim 8, wherein each of the plurality of ceiling mirrors has an area that is smaller than an area A of the top of a server rack.

10. The reconfigurable free-space optical inter-rack network of claim 8, wherein the controller reconfigures connections between pairs of free-space-optic link connectors in response to network traffic demands and events.

11. A reconfigurable free-space optical inter-rack network, comprising:
a plurality of server racks, each including at least one switch mounted thereon;
wherein each switch includes a plurality of free-space-optic link connector, each with a free-space optical connection to a free-space-optic link connector on another switch, wherein the free-space-optic link connector comprises a mirror galvanometer (GM) configured to rotate around the axis on a plane of the mirror in response to an electric signal;
a plurality of ceiling mirrors above the plurality of server racks, wherein each of the plurality of ceiling mirrors has an area that is smaller than an area of the top of a server rack, wherein each single ceiling mirror redirects optical connections between one or more pairs of free-space-optic link connectors to provide a clear lines-of-sight between each pair of connected free-space-optic link connectors; and
a controller that preconfigures a free-space optical network connecting the plurality of server racks by establishing connections between pairs of free-space-optic link connectors, and that reconfigures connections between pairs of free-space-optic link connectors in response to network traffic demands and events,
wherein the controller preconfigures an orientation of each GM to create a set of candidate links with optimal performance over a network of said links while minimizing usage of the overhead mirrors, wherein there is an orientation of a GM at each switch so that all assigned links at said switch are covered by the GM.

* * * * *